United States Patent
Kato

(10) Patent No.: US 8,625,958 B2
(45) Date of Patent: *Jan. 7, 2014

(54) APPARATUS AND METHOD FOR IMAGE CODING AND DECODING

(75) Inventor: Motoki Kato, Kanagawa (JP)

(73) Assignee: Sony Corporation (JP)

( * ) Notice: Subject to any disclaimer, the term of this patent is extended or adjusted under 35 U.S.C. 154(b) by 1664 days.

This patent is subject to a terminal disclaimer.

(21) Appl. No.: 11/708,774

(22) Filed: Feb. 21, 2007

(65) Prior Publication Data

US 2007/0147789 A1     Jun. 28, 2007

Related U.S. Application Data

(63) Continuation of application No. 09/872,147, filed on Jun. 1, 2001, now Pat. No. 7,224,890.

(30) Foreign Application Priority Data

Jun. 2, 2000 (JP) ................................ P2000-165298
Jan. 9, 2001 (JP) ................................ P2001-001031

(51) Int. Cl.
*H04N 5/765*       (2006.01)

(52) U.S. Cl.
USPC ........... 386/232; 386/248; 386/264; 386/284; 386/332; 386/230

(58) Field of Classification Search
USPC .................. 386/248, 264, 284, 332, 232, 230
See application file for complete search history.

(56) References Cited

U.S. PATENT DOCUMENTS 5,231,492 A * 7/1993 Dangi et al. ............... 348/14.12
5,327,235 A    7/1994 Richards
5,519,446 A    5/1996 Lee
5,731,847 A * 3/1998 Tsukagoshi .................. 348/589
5,754,235 A    5/1998 Urano et al.

(Continued)

FOREIGN PATENT DOCUMENTS

EP       0665693 A2    8/1995
EP       0 915 623 A1   5/1999

(Continued)

OTHER PUBLICATIONS

MPEG-2 Video: ITU-T Recommendation H.262, International Standard ISO/IEC 13818.2, "Information Technology—Generic Coding of Moving Pictures and Associated Audio Information: Video", (1995) pp. 2-8 and 39-62.

(Continued)

*Primary Examiner* — Helen Shibru
(74) *Attorney, Agent, or Firm* — Lerner, David, Littenberg, Krumholz & Mentlik, LLP

(57) ABSTRACT

A computer-readable medium has data stored thereon for processing by an image decoding apparatus so that multimedia content is presented in an intended manner by a display. A data recording area contains data representing a converted video stream, at least another stream, and multimedia coding data for controlling display of the video stream and the at least another stream on a common display device. The converted video stream is generated by performing a predetermined conversion process on an original video stream. The predetermined conversion process is controlled by additional information such that a display mismatch between the converted video stream and the at least another stream is avoided. The additional information is based on the multimedia coding data.

14 Claims, 25 Drawing Sheets

(56) References Cited

U.S. PATENT DOCUMENTS

| | | | |
|---|---|---|---|
| 5,847,770 A * | 12/1998 | Yagasaki | 348/563 |
| 5,848,217 A * | 12/1998 | Tsukagoshi et al. | 386/239 |
| 5,862,300 A * | 1/1999 | Yagasaki et al. | 386/230 |
| 5,912,710 A | 6/1999 | Fujimoto | |
| 5,970,072 A | 10/1999 | Gammenthaler, Jr. et al. | |
| 6,011,598 A | 1/2000 | Tsuji et al. | |
| 6,055,270 A | 4/2000 | Ozkan et al. | |
| 6,160,954 A * | 12/2000 | Ogawa | 386/208 |
| 6,310,915 B1 | 10/2001 | Wells et al. | |
| 6,393,202 B1 | 5/2002 | Yamauchi et al. | |
| 6,424,792 B1 * | 7/2002 | Tsukagoshi et al. | 386/243 |
| 6,483,945 B1 | 11/2002 | Kato et al. | |
| 6,490,320 B1 | 12/2002 | Vetro et al. | |
| 6,785,463 B2 | 8/2004 | Yamauchi et al. | |
| 6,788,347 B1 * | 9/2004 | Kim et al. | 348/441 |
| 6,801,709 B1 * | 10/2004 | Park | 386/345 |
| 6,900,845 B1 | 5/2005 | Christopher et al. | |
| 6,915,531 B2 * | 7/2005 | Yun | 725/131 |
| 7,010,032 B1 | 3/2006 | Kikuchi et al. | |
| 7,020,195 B1 | 3/2006 | McMahon | |
| 7,072,396 B2 | 7/2006 | Wang | |
| 7,872,668 B2 | 1/2011 | Mead et al. | |
| 7,986,846 B2 | 7/2011 | Seo et al. | |
| 7,995,896 B1 * | 8/2011 | Comer et al. | 386/337 |
| 2001/0052135 A1 | 12/2001 | Balakrishnan et al. | |
| 2002/0012530 A1 | 1/2002 | Bruls | |
| 2002/0057382 A1 | 5/2002 | Yui | |
| 2002/0176506 A1 | 11/2002 | Ferreira Florencio et al. | |
| 2003/0001981 A1 * | 1/2003 | Milne | 348/839 |

FOREIGN PATENT DOCUMENTS

| | | |
|---|---|---|
| EP | 0 989 563 A2 | 3/2000 |
| EP | 1 001 582 A2 | 5/2000 |
| JP | 11102550 A | 4/1999 |
| JP | 11285002 A | 10/1999 |
| JP | 2000059788 A | 2/2000 |
| WO | WO-99/23560 A1 | 5/1999 |

OTHER PUBLICATIONS

Wee, S.J. et al., "Field-to-Frame Transcoding With Spatial and Temporal Downsampling", IEEE, US, Oct. 24, 1999, pp. 271-275.

Hori et al., "Annotation of Web Content for Transcoding", W3C NOTE, Jul. 10, 1999, pp. 1-11.

Office Action from Japanese Application No. 2001-136505, dated Feb. 15, 2011.

European Search Report Application No. EP 10176823, dated Apr. 4, 2012.

Hori et al: "Annotation of Web content for Transcoding", W3C NOTE. Jul. 10, 1999 XP 002264429, Retrieved from the Internet: URL:http://www.w3/org/TR/annot [retrieved on Dec. 9, 2003].

"High Definition (HD) Image Formats for Television Production", EBU Technical Jan. 1, 2010, pp. 1-10, XP 55022496, Geneva Retrieved from the Internet: URL:http://tech.ebu.ch/docs/tech/tech3299.pdf [retrieved on Mar. 21, 2012].

Communication from EP Application No. 01304813.7, dated Feb. 28, 2012.

Office Action from Japanese Application No. 2011-092191, dated Dec. 4, 2012.

* cited by examiner

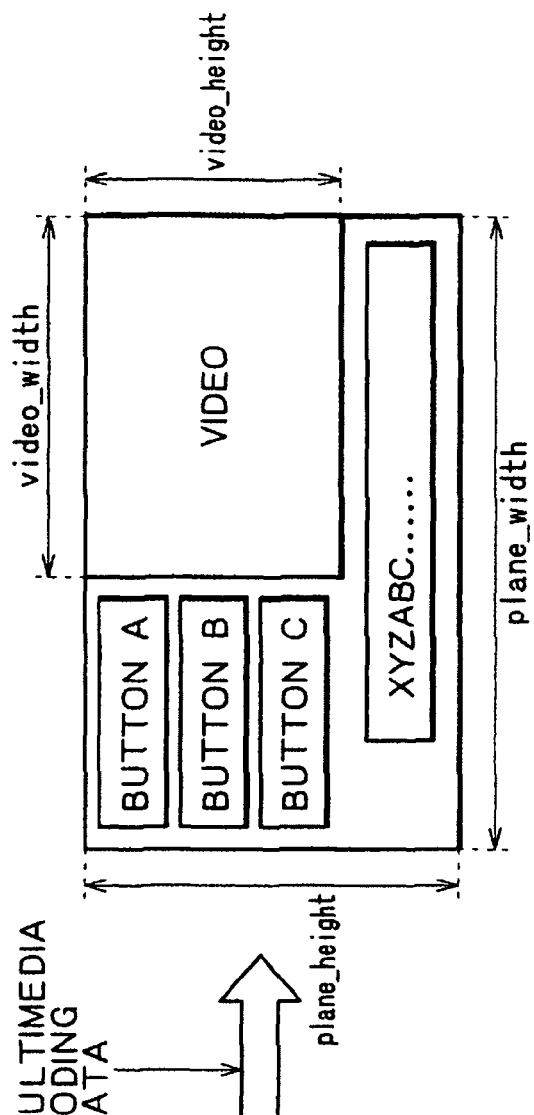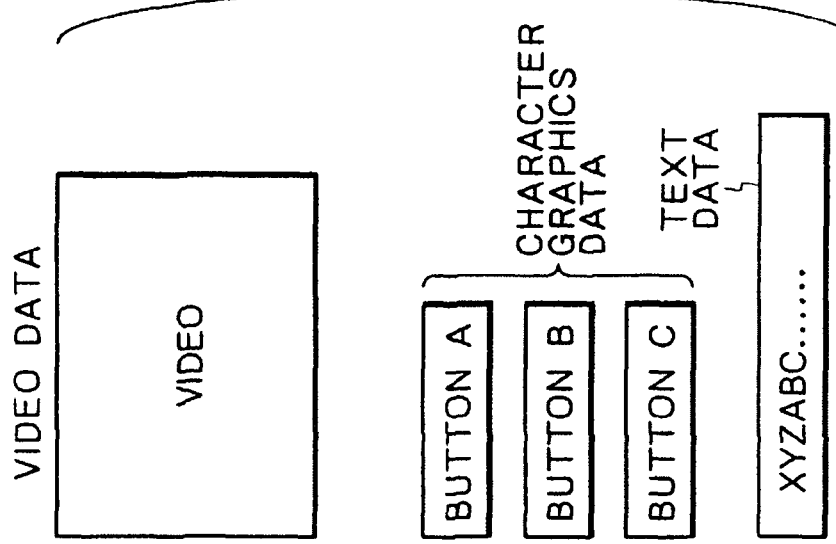

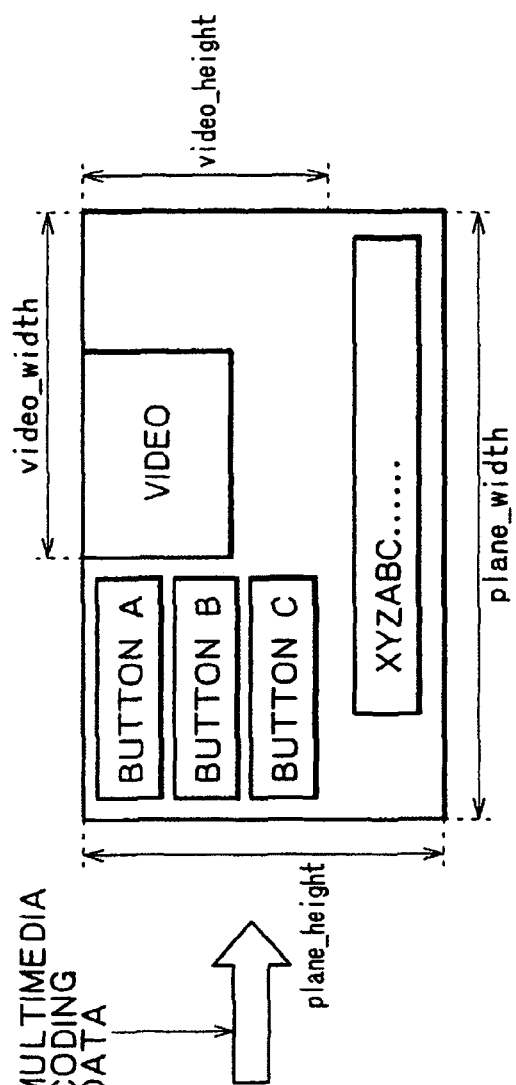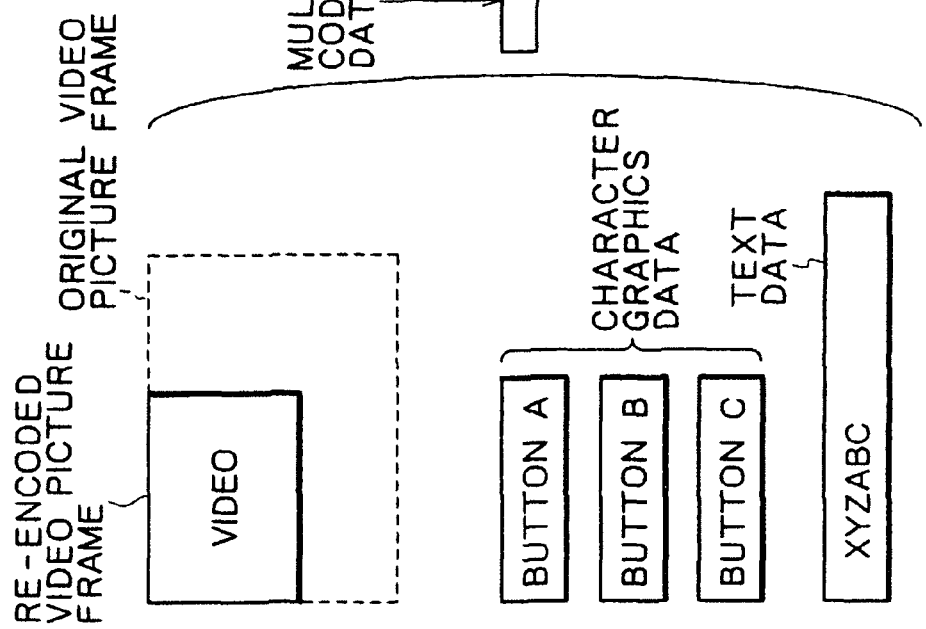

FIG. 7

| Syntax | No. of bits | Mnemomic |
|---|---|---|
| ProgramInfo() { | | |
|   length | 32 | uimsbf |
|   reseved_for_word_align | 8 | bslbf |
|   num_of_program_sequences | 8 | uimsbf |
|   for(i=0; i<*num_of_program_sequences*; i++) { | | |
|     SPN_program_sequences_start | 32 | uimsbf |
|     program_map_PID | 16 | bslbf |
|     num_of_streams_in_ps | 8 | uimsbf |
|     num_of_groups | 8 | uimsbf |
|     for(*stream_index*=0;<br>        *stream_index*<*num_of_streams_in_ps*;<br>        *stream_index*++) { | | |
|       stream_PID | 16 | uimsbf |
|       StreamCodingInfo() | | |
|     } | | |
|     if(*num_of_groups*>1) { | | |
|       for(i=0; i<*num_of_groups*; i++) { | | |
|         num_of_streams_in_group | 8 | uimsbf |
|         for(k=0;k<*num_of_streams_in_group*;k++) { | | |
|           stream_index | 8 | uimsbf |
|         } | | |
|         if(num_of_streams_in_group%2==0) { | | |
|           reserved_for_word_align | 8 | bslbf |
|         } | | |
|       } | | |
|     } | | |
|   } | | |
| } | | |

EXAMPLE OF ProgramInfo() SYNTAX

FIG. 8

| Syntax | No. of bits | Mnemomic |
|---|---|---|
| StreamCodingInfo() { | | |
|     length | 8 | bslbf |
|     stream_coding_type | 8 | uimsbf |
|     if(stream_coding_type==0x02) { | | |
|         video_format | 4 | uimsbf |
|         frame_rate | 4 | uimsbf |
|         display_aspect_ratio | 4 | uimsbf |
|         reserved_for_word_align | 2 | bslbf |
|         cc_flag | 1 | uimsbf |
|         original_video_format_flag | 1 | |
|         if(original_video_format_flag==1) { | | |
|             original_video_format | 4 | uimsbf |
|             original_display_aspect_ratio | 4 | uimsbf |
|             reserved_for_word_align | 8 | bslbf |
|         } | | |
|     }else if(stream_coding_type==0x03// | | |
|             stream_coding_type==0x04// | | |
|             stream_coding_type==0x0F// | | |
|             stream_coding_type==0x80// | | |
|             stream_coding_type==0x81) { | | |
|         audio_presentation_type | 4 | uimsbf |
|         sampling_frequency | 4 | uimsbf |
|         reserved_for_word_align | 8 | bslbf |
|     } | | |
| } | | |

StreamCodingInfo() SYNTAX (ANOTHER EXAMPLE OF MULTIMEDIA DISPLAY SUB INFORMATION)

FIG. 9 stream_coding_type

| stream_coding_type | Meaning |
|---|---|
| 0x00-0x01 | reserved for future use |
| 0x02 | MPEG-1 or MPEG-2 video stream |
| 0x03 | MPEG-1 audio |
| 0x04 | MPEG-2 multi-channel audio, backward compatible to MPEG-1 |
| 0x05 | reserved for future use |
| 0x06 | Teletext defined in SESF or DVB or Subtitle defined in ISDB |
| 0x07-0x09 | reserved for future use |
| 0x0A | ISO/IEC 13818-6 type A |
| 0x0B | ISO/IEC 13818-6 type B |
| 0x0C | ISO/IEC 13818-6 type C |
| 0x0D | ISO/IEC 13818-6 type D |
| 0x0E | reserved for future use |
| 0x0F | MPEG-2 AAC audio with ADTS transport syntax |
| 0x10-0x7F | reserved for future use |
| 0x80 | SESF LPCM audio |
| 0x81 | Dolby AC-3 audio |
| 0x82-0xFF | reserved for future use |

FIG. 10 video_format

| video_format | Meaning | Video standard |
|---|---|---|
| 0 | 480i | ITU-R BT.601-4 |
| 1 | 576i | ITU-R BT.601-4 |
| 2 | 480p | SMPTE 293M |
| 3 | 1080i | SMPTE 274M |
| 4 | 720p | SMPTE 296M |
| 5-14 | reserved for future use | |
| 15 | No information | |

FIG. 11 frame_rate

| frame_rate | Meaning |
|---|---|
| 0 | reserved for future use |
| 1 | 24 000/1001 (23.976...) |
| 2 | 24 |
| 3 | 25 |
| 4 | 30 000/1001 (29.97...) |
| 5 | 30 |
| 6 | 50 |
| 7 | 60 000/1001 (59.94...) |
| 8 | 60 |
| 9-14 | reserved for future use |
| 15 | No information |

FIG. 12 display_aspect_ratio

| display_aspect_ratio | Meaning |
|---|---|
| 0 | reserved for future use |
| 1 | reserved for future use |
| 2 | 4:3 display aspect ratio |
| 3 | 16:9 display aspect ratio |
| 4 | 2.21:1 display aspect ratio |
| 5-14 | reserved for future use |
| 15 | No information |

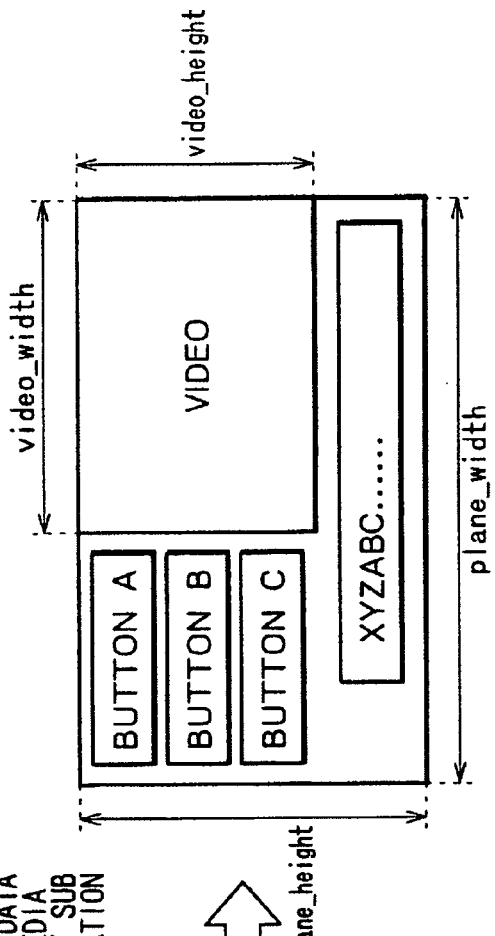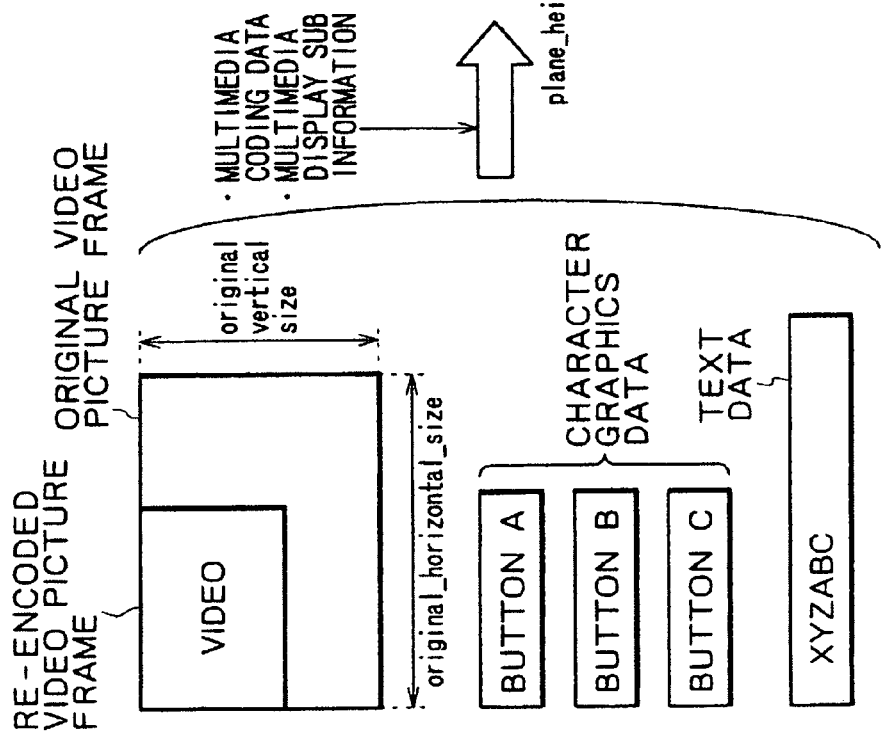

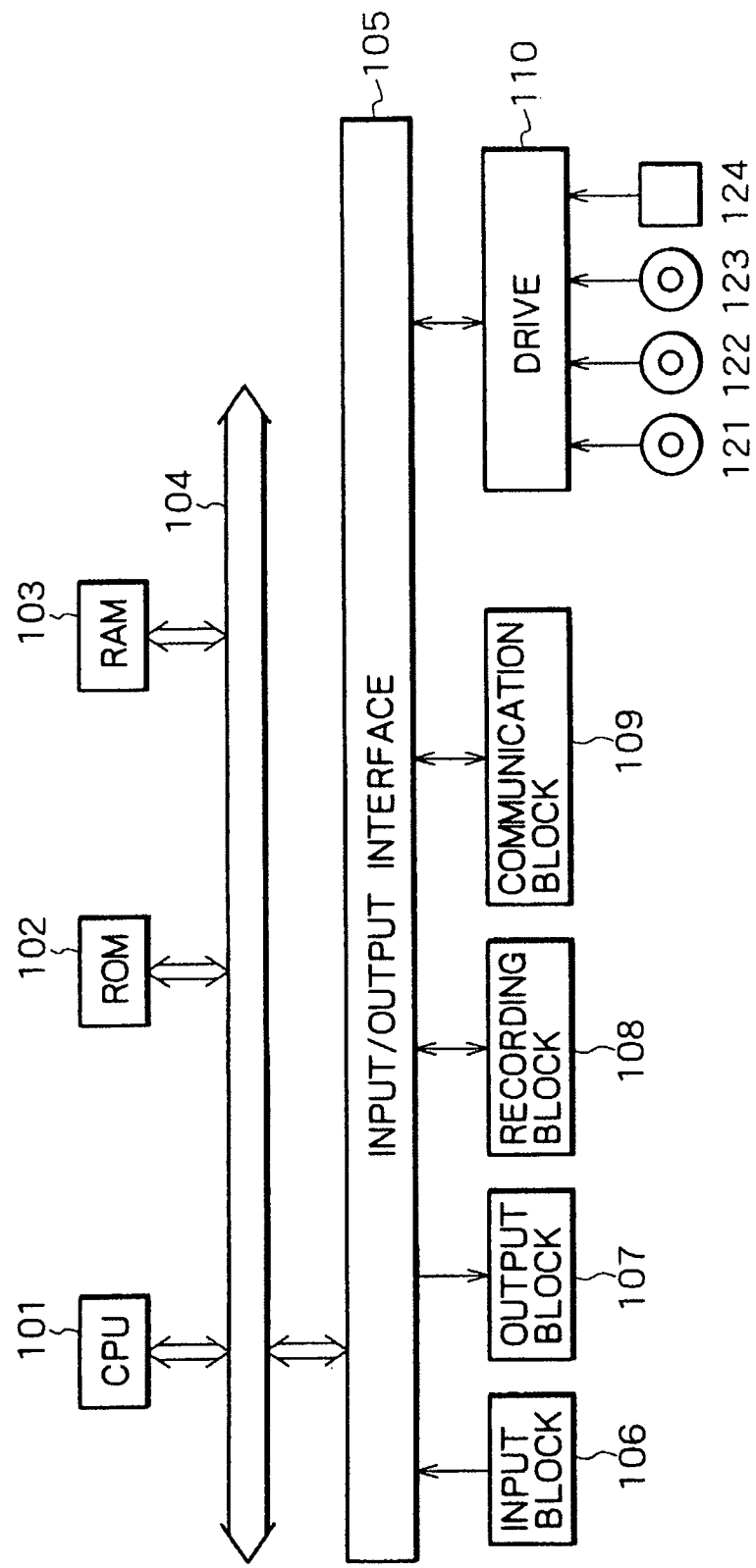

APPARATUS AND METHOD FOR IMAGE CODING AND DECODING

CROSS-REFERENCE TO RELATED APPLICATIONS

The present application is a continuation of U.S. application Ser. No. 09/872,147, filed Jun. 1, 2001, which claims priority from Japanese Application No. P2000-165298, filed Jun. 2, 2000, and Japanese Application No. P2001-001031, filed Jan. 9, 2001, the disclosures of which are incorporated by reference herein.

BACKGROUND OF THE INVENTION

The present invention relates generally to an image coding apparatus and method, an image decoding apparatus and method, and a recording medium. More specifically, the present invention relates to an image coding apparatus and method, an image decoding apparatus and method, and a recording medium which are suitable for use in apparatus for re-encoding video streams and recording and reproducing the re-encoded video streams.

Digital television broadcasts such as European DVB (Digital Video Broadcast), American DTV (Digital Television) broadcast, and Japanese BS (Broadcast Satellite) digital broadcast use MPEG (Motion Picture Expert Group) 2 transport streams. A transport stream consists of continuous transport packets, each packet carrying video data or audio data, for example. The data length of one transport packet is 188 bytes.

Unlike analog television broadcasts, digital television broadcasts are capable of providing services added with multimedia coding data. In these services, data such as video data, audio data, character graphics data, and still picture data, for example, are associated with each other for transmission by the multimedia coding data. For the multimedia coding data, a coding method based on XML (Extensible Markup Language) is used in the Japanese BS digital broadcast, for example. The details of this method are disclosed in ARIB STD-B24 Data Coding And Transmission Specification for Digital Broadcasting, for example.

Data such as video data, audio data, character graphics data, and still picture data are each packetized into a transport packet for transmission.

FIGS. 1A and 1B show an example of synthesizing data to be transferred between the sending and receiving sides and a multimedia screen. As shown in FIG. 1A, the sending side sends to the receiving side video data, character graphics data for displaying buttons A through C, text data for displaying "XYZABC . . . ," and multimedia coding data for relating these data to each other. The sending side generally denotes a television broadcast station, for example. However, herein it denotes a television broadcast station which includes a recording apparatus (the recording side) which receives and records data transmitted from broadcast stations, as shown in the example illustrated in FIG. 1A including the data which is output from this recording apparatus.

The multimedia coding data includes data which can synthesize on the receiving side video data, character graphics data, and text data and display the synthesized data. To be more specific, the multimedia coding data includes the data associated with the display positions of the video, character graphics, and text which are displayed by the size-associated data such as the multimedia plane (the display area of images on the television receiver, for example) size (plane_height and plane_width) and video display size (video_height and video_width), video data, character graphics data, and text data, as shown in FIG. 1B.

On the basis of the multimedia coding data, the receiving side processes the video data, the character graphics data, and the text data to display a resultant image, as shown in FIG. 1B.

Through the screen on which the above-mentioned image is displayed, the user can receive services such as displaying desired information in the video section by clicking button A corresponding to that information and obtaining, from the text data displayed in the bottom of the screen, the information associated with the matter displayed in the video section, for example.

If a television program carried by a transport stream transmitted from a digital television broadcast is recorded without change to a recording medium on the received side, the program can be recorded without its picture and audio qualities being deteriorated at all. However, in order to record as long a television program as possible to a recording medium having a limited recording capacity by presupposing a certain degree of picture quality deterioration, the received video stream must be decoded and then encoded again to lower the bit rate of the transport stream.

For example, the re-encoding of the video stream of a television program attached with multimedia coding data to lower its bit rate for recording may be implemented by subsampling the image to change writing blocks. However, this approach presents a problem of causing a mismatch in the relationship between the video stream resulting from re-encoding and the multimedia coding data. The following describes an example of this mismatch with reference to FIGS. 2A and 2B.

In the example shown in FIG. 2A, the sending side (the recording side) converts the original video writing block to a smaller picture frame at the time of re-encoding. Therefore, as shown in FIG. 2B, on the receiving side (the reproducing side), changes occur in the video display size and position, resulting in a display screen which is different from the display screen intended by the sending side (the display screen to be displayed on the basis of the data before being re-encoded).

It is therefore desirable to provide an image coding apparatus and method, an image decoding apparatus and method, and a recording medium, wherein there is no mismatch of information caused in the relationship between a video stream after re-encoding and other data is generated and recorded on the recording side and reproduction on the reproducing side. For example, it is desirable to prevent a smaller picture frame from occurring on the reproducing side by referencing the information generated on the recording side.

SUMMARY OF THE INVENTION

In carrying out the invention and according to a first aspect thereof, there is provided a first image coding apparatus comprising: inputting means for inputting a multiplexed stream containing multimedia coding data; separating means for separating a video stream from the multiplexed stream input to the separating means from the inputting means; converting means for performing a predetermined converting process on the video stream separated by the separating means; generating means for generating additional information indicating that a mismatch will occur when the converted video stream is displayed on the basis of the multimedia coding data; and outputting means for outputting the converted video stream, the multimedia coding data, and the additional information.

The first image coding apparatus may further comprise: coding means for coding the additional information generated by the generating means as data separate from the multiplexed stream containing the converted video stream.

The first image coding apparatus may further comprise: coding means for multiplexing the additional information generated by the generating means with the multiplexed stream containing the converted video stream and then coding a multiplexed result.

The converting means may convert a video stream picture frame parameter.

The conversion by the converting means may include at least a process of decoding the video stream separated by the separating means and a process of encoding the decoded video stream.

The additional information generated by the generating means may contain at least one of an original picture frame information and an original screen aspect ratio.

The additional information generated by the generating means may contain an original video format and a video format after the conversion.

The additional information generated by the generating means may contain an original screen aspect ratio and a screen aspect ratio after the conversion.

The additional information generated by the generating means may contain at least one of information indicating whether or not a picture frame of the video stream has been converted by the converting means, information about an original picture frame of the video stream separated by the separating means, and an original screen aspect ratio.

In carrying out the invention and according to a second aspect thereof, there is provided a first image coding method comprising the steps of: inputting a multiplexed stream containing multimedia coding data; separating a video stream from the multiplexed stream input in the inputting step; performing a predetermined converting process on the video stream separated in the separating step; generating additional information indicating that a mismatch will occur when the converted video stream is displayed on the basis of the multimedia coding data; and outputting the converted video stream, the multimedia coding data, and the additional information.

The first image coding method may further comprise the step of: coding the additional information generated in the generating step as data separate from the multiplexed stream containing the converted video stream.

The first image coding method may further comprise: a coding step of multiplexing the additional information generated in the generating step with the multiplexed stream containing the converted video stream and then coding a multiplexed result.

A video stream picture frame parameter may be converted in the converting step.

The conversion in the converting step may include at least a process of decoding the video stream separated in the separating step and a process of encoding the decoded video stream.

The additional information generated in the generating step may contain at least one of original picture frame information and an original screen aspect ratio.

The additional information generated in the generating step may contain an original video format and a video format after the conversion.

The additional information generated in the generating step may contain an original screen aspect ratio and a screen aspect ratio after the conversion.

The additional information generated in the generating step may contain at least one of information indicating whether or not a picture frame of the video stream has been converted in the converting step, information about an original picture frame of the video stream separated in the separating step, and an original screen aspect ratio.

In carrying out the invention and according to a third aspect thereof, there is provided a first method for recording a computer-readable program on a first recording medium, the method comprising: inputting a multiplexed stream containing multimedia coding data; separating a video stream from the multiplexed stream input; performing a predetermined converting process on the video stream separated from the multiplexed stream to form a converted video stream; generating additional information indicating that a mismatch will occur when the converted video stream is displayed on the basis of the multimedia coding data; and outputting the converted video stream, the multimedia coding data, and the additional information.

In carrying out the invention and according to a fourth aspect thereof, there is provided a second computer-readable medium having data stored thereon for processing by an image decoding apparatus so that multimedia content is presented in an intended manner by a display. The computer-readable medium having a data recording area data representing a converted video stream, at least another stream, and multimedia coding data for controlling display of the video stream and the at least another stream on a common display device, the converted video stream being generated by performing a predetermined conversion process on an original video stream, the predetermined conversion process being controlled by additional information such that a display mismatch between the converted video stream and the at least another stream is avoided, the additional information being based on the multimedia coding data.

The additional information may be coded and recorded as data different from a multiplexed stream containing the converted video stream.

The additional information may be coded and recorded as multiplexed with a multiplexed stream containing the converted video stream.

The video stream may be converted in its picture frame parameter.

The video stream may be decoded and then encoded.

The additional information may contain at least one of original picture frame information and an original screen aspect ratio.

The additional information may contain information about an original video format and information about a video format after the conversion.

The additional information may contain information about an original screen aspect ratio and information about a screen aspect ratio after the conversion.

The additional information may contain at least one of information indicating whether a picture frame of the video stream has been converted, information about an original picture frame of the video stream, and information about an original screen aspect ratio.

In carrying out the invention and according to a fifth aspect thereof, there is provided a first image decoding apparatus comprising: inputting means for inputting a multiplexed stream containing multimedia coding data; separating means for separating a video stream from the multiplexed stream input by the inputting means; decoding means for decoding the video stream separated from said multiplexed stream by the separating means; and processing means for performing a predetermined conversion process on the decoded video stream in accordance with additional information indicating an occurrence of a mismatch when displaying the decoded video stream on the basis of the multimedia decoding data.

The first image decoding apparatus may further comprise: acquiring means for acquiring the additional information from data different than the multiplexed stream.

The first image decoding apparatus may further comprise: acquiring means for acquiring the additional information from a multiplexed stream containing the additional information.

The processing means may convert a picture frame parameter of the video stream.

The conversion by the processing means may include at least a process of decoding the video stream separated by the separating means from said multiplexed stream and a process of encoding the decoded video stream.

The additional information may contain at least one of information about an original picture frame and information about an original screen aspect ratio.

The additional information may contain an original video format and information about a video format after the conversion.

The additional information may contain information about an original screen aspect ratio and information about a screen aspect ratio after the conversion.

The additional information may contain at least one of information indicating whether a picture frame of the video stream has been converted by the converting means, information about an original picture frame of the video stream separated by the separating means, and information about an original screen aspect ratio.

In carrying out the invention and according to a sixth aspect thereof, there is provided a first image decoding method comprising the steps of: inputting a multiplexed stream containing multimedia coding data; separating a video stream from the multiplexed stream input in the inputting step; decoding the video stream separated in the separating step; and performing a predetermined conversion process on the decoded video stream in accordance with additional information indicating an occurrence of a mismatch when displaying the decoded video stream on the basis of the multimedia decoding data.

The first image decoding method may further comprise the step of: acquiring the additional information from data different than the multiplexed stream.

The first image decoding method may further comprise the step of: acquiring the additional information from a multiplexed stream containing the additional information.

A picture frame parameter of the video stream may be converted in the processing step.

The conversion in the processing step may include at least a process of decoding the video stream separated from the multiplexed stream in the separating step and a process of encoding the decoded video stream.

The additional information may contain at least one of information about an original picture frame and information about an original screen aspect ratio.

The additional information may contain an original video format and information about a video format after the conversion.

The additional information may contain information about an original screen aspect ratio and information about a screen aspect ratio after the conversion.

The additional information may contain at least one of information indicating whether a picture frame of the video stream has been converted in the converting step, information about an original picture frame of the video stream separated in the separating step, and information about an original screen aspect ratio.

In carrying out the invention and according to a seventh aspect thereof, there is provided a second method for recording a computer-readable program on a third recording medium, the method comprising the steps of: inputting a multiplexed stream containing multimedia coding data; separating a video stream from the multiplexed stream input in the inputting step; decoding the video stream separated from the multiplexed stream in the separating step; and performing a predetermined conversion process on the decoded video stream in accordance with additional information indicating occurrence of a mismatch when displaying the decoded video stream on the basis of the multimedia decoding data.

In carrying out the invention and according to an eighth aspect thereof, there is provided a second image coding apparatus comprising: inputting means for inputting a multiplexed stream; separating means for separating a video stream from the multiplexed stream input by the inputting means; determining means for determining whether multimedia coding data is contained in the multiplexed stream input by the inputting means; generating means for generating coding control information based on the presence of said multimedia coding data for instructing that a display format of the video stream separated by the separating means is not changed; converting means for performing a predetermined conversion process on the video stream separated by the separating means on the basis of the coding control information generated by the generating means; and multiplexing means for generating a multiplexed stream that contains the video stream converted by the converting means.

The generating means may provide an instruction not to change any of a picture frame, a video format, and an aspect ratio.

In carrying out the invention and according to a ninth aspect thereof, there is provided a second image coding method comprising the steps of: inputting a multiplexed stream; separating a video stream from the multiplexed stream input in the inputting step; determining whether multimedia coding data is contained in the multiplexed stream input in the inputting step; generating coding control information based on the presence of said multimedia coding data in said multiplexed stream for instructing that a display format of the video stream separated in the separating step is not changed; performing a predetermined conversion process on the video stream separated in the separating step on the basis of the coding control information generated in the generating step; and generating a multiplexed stream that contains the video stream converted in the converting step.

Coding control information for providing an instruction not to change any of a picture frame, a video format, and an aspect ratio may be generated in the generating step.

In carrying out the invention and according to a tenth aspect thereof, there is provided a third method for recording a computer-readable program on a fourth recording medium, the method comprising the steps of: inputting a multiplexed stream; separating a video stream from the multiplexed stream input in the inputting step; determining whether multimedia coding data is contained in the multiplexed stream input in the inputting step; generating coding control information based on the presence of the multimedia coding in the multiplexed stream for instructing that a display format of the video stream separated in the separating step is not changed; performing a predetermined conversion process on the video stream separated in the separating step on the basis of the coding control information generated in the generating step;

and generating a multiplexed stream that contains the video stream converted in the converting step.

In carrying out the invention and according to an eleventh aspect thereof, there is provided a fifth recording medium comprising a data recording area, wherein coding control information is recorded for instructing that a display format is not changed for a video stream and a multiplexed stream containing a video stream on which a predetermined conversion process has been performed on the basis of the coding control information.

As described and according to the first image coding apparatus and method and the program stored in the first recording medium, a video steam is separated from a multiplexed stream containing multimedia coding data, and a predetermined conversion process is performed on the separated video stream, and additional information indicating that a mismatch will occur when displaying the converted video stream on the basis of the multimedia coding data.

The second recording medium stores a video stream converted by a predetermined conversion process, the multimedia coding data, and the additional information indicating that a mismatch will occur when displaying the converted video stream on the basis of the above-mentioned multimedia coding data.

As described and according to the image decoding apparatus and method and the program stored in the third recording medium, when a video stream is separated from an input multiplexed stream, the separated video stream is decoded, and the decoded video stream is displayed on the basis of multimedia coding data, a mismatch occurs. On the basis of the additional information about this mismatch occurrence, a predetermined conversion process is performed on the decoded video stream. This novel configuration prevents the mismatch from occurring between the video stream and the multimedia coding data.

As described and according to the second image coding apparatus and method and the program stored in the fourth recording medium, a video stream is separated from an input multiplexed stream, the input multiplexed stream is checked whether or not multimedia coding data is contained and, if the multimedia coding data is contained, coding control information for giving an instruction not to change the display format of the separated video stream is generated, and a predetermined conversion process is performed on the separated video stream on the basis of the generated coding control information.

The fifth recording medium also stores the above-mentioned coding control information giving instruction not to change the display format of a video stream and a multiplexed stream containing the video stream on which a predetermined conversion process has been performed on the basis of the coding control information.

BRIEF DESCRIPTION OF THE DRAWINGS

These and other objects of the invention will be seen by reference to the description, taken in connection with the accompanying drawings, in which:

FIGS. 1A and 1B are schematic diagrams illustrating a display screen to be shown on the basis of multimedia coding information;

FIGS. 2A and 2B are schematic diagrams illustrating a mismatch which takes place when a video stream is re-encoded;

FIG. 7 illustrates an example of ProgramInfo( ) syntax;

FIG. 8 illustrates an example of StreamCodingInfo( ) syntax;

FIG. 9 illustrates the meaning of stream_coding type;

FIG. 10 illustrates the meaning of video_format;

FIG. 11 illustrates the meaning of frame_rate;

FIG. 12 illustrates the meaning of display_aspect_ratio;

FIGS. 22A and 22B illustrate a display screen to be shown when multimedia display sub-information is added;

FIG. 26 illustrates recording media.

DETAILED DESCRIPTION

Figure 3:
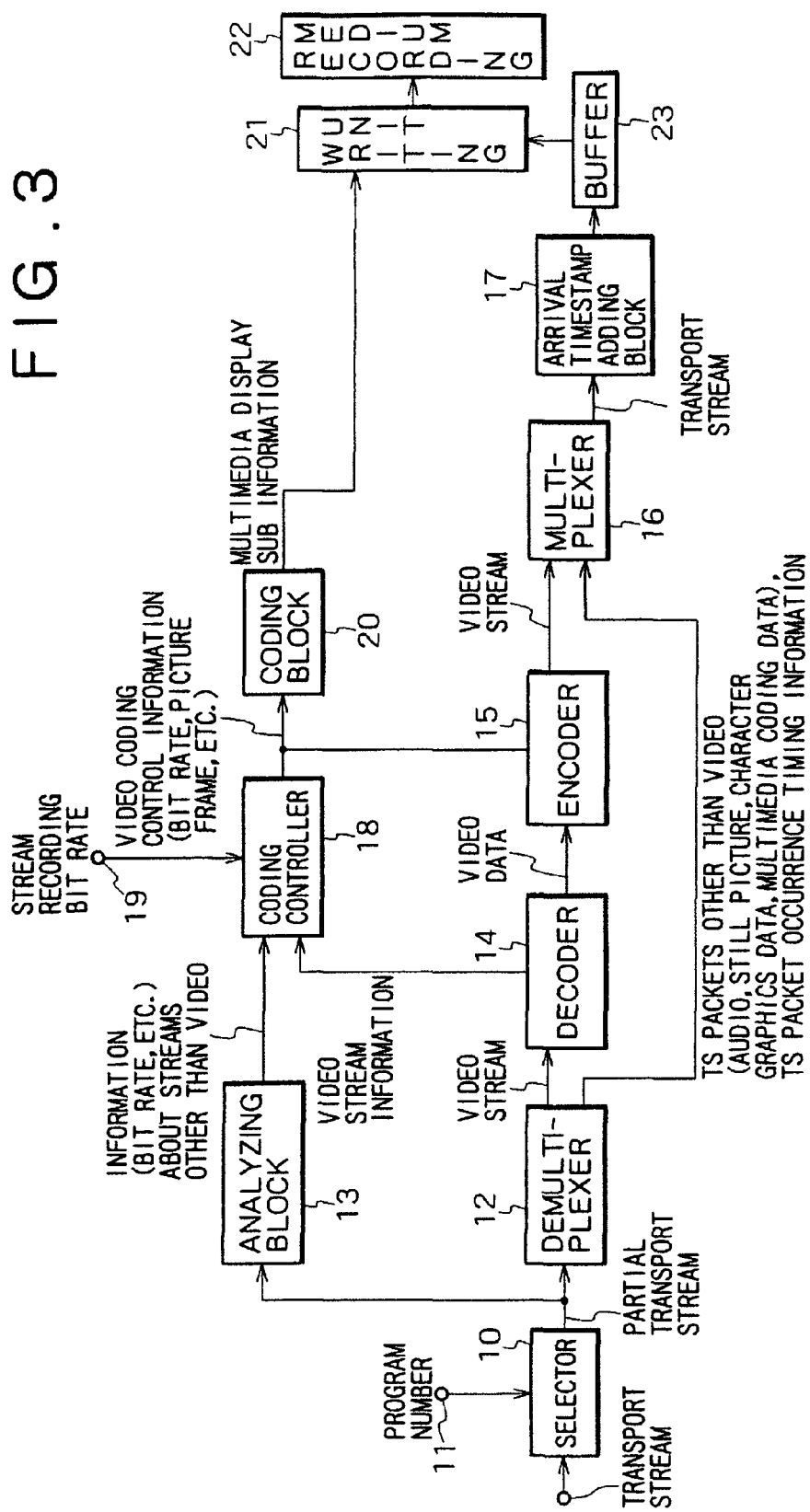
FIG. 3 is a block diagram illustrating a recording apparatus practiced as one embodiment of the present invention.

This invention will be described in further detail by way of example with reference to the accompanying drawings. Now, referring to FIG. 3, there is shown a block diagram illustrating an exemplary configuration of a recording apparatus 1 practiced as one embodiment of the invention. A transport stream received at an antenna, not shown, is input in a selector 10. A program number (a channel number) specified by the user is also input from a terminal 11 to the selector 10. Referring to the received program number, the selector 10 extracts the specified program from the received transport stream and outputs a partial transport stream. The partial transport stream is input in a demultiplexer 12 and an analyzing block 13.

The partial transport stream input in the demultiplexer 12 is separated into a video stream and other streams (audio, still picture, character graphics, and multimedia coding data for example). The video stream thus obtained is output to a decoder 14. The other streams are output to a multiplexer 16. In addition to the transport packets other than video, the demultiplexer 12 outputs the output timing information in the input transport stream of these transport packets to the multiplexer 16.

The decoder 14 applies a predetermined decoding scheme, for example, MPEG2 to the input video stream and outputs the decoded video data to an encoder 15. Also, the decoder 14 outputs the stream information about the video stream obtained at decoding to a coding controller 18.

On the other hand, the analyzing block 13 analyzes the input transport stream to obtain the stream information about the non-video streams, for example, a bit rate, and outputs it to the coding controller 18. The stream information about the non-video streams output from the analyzing block 13, the video stream information output from decoder 14, and a stream recording bit rate output from a terminal 19 are input in the coding controller 18. From these data, the coding controller 18 sets the video data coding conditions (coding control information) to be executed by the encoder 15 and outputs these coding conditions to the encoder 15 and a coding block 20.

The coding controller 18 uses, as a bit rate to be allocated to the video data encoding, a value obtained by subtracting a total value (the data input from the analyzing block 13) of the bit rates of the non-video streams from a stream recording bit rate (the data input, via the terminal 19, from a controller, not shown, for controlling the operation of the recording apparatus 1, for example). The coding controller 18 sets coding control information such as bit rate and picture frame such that an optimum picture quality can be achieved with the bit rate thus obtained and outputs this coding control information to the encoder 15 and the coding block 20. The details of the coding control information will be described later with reference to FIGS. 15 through 20.

When a stream is recorded to a recording medium with a fixed rate, this stream recording bit rate becomes the fixed rate; if a stream is recorded with a variable bit rate, this stream recording bit rate is a mean bit rate per predetermined time. However, the maximum value of the variable bit rate in this case needs to be lower than the maximum recording bit rate ensured by the recording medium concerned.

The encoder 15 encodes (on the basis of MPEG2, for example) the video data output from the decoder 14 on the basis of the coding control information output from the coding controller 18 and outputs the resultant video data to the multiplexer 16. The video stream from the encoder 15, the transport stream packets other than video from the demultiplexer 12, and the information about the occurrence timing of the transport stream packets other than video are input in the multiplexer 16. On the basis of the input occurrence timing information, the multiplexer 16 multiplexes the video stream with the transport stream packets, other than video, and outputs the result to the arrival timestamp adding block 17 as a transport stream.

Figure 4:
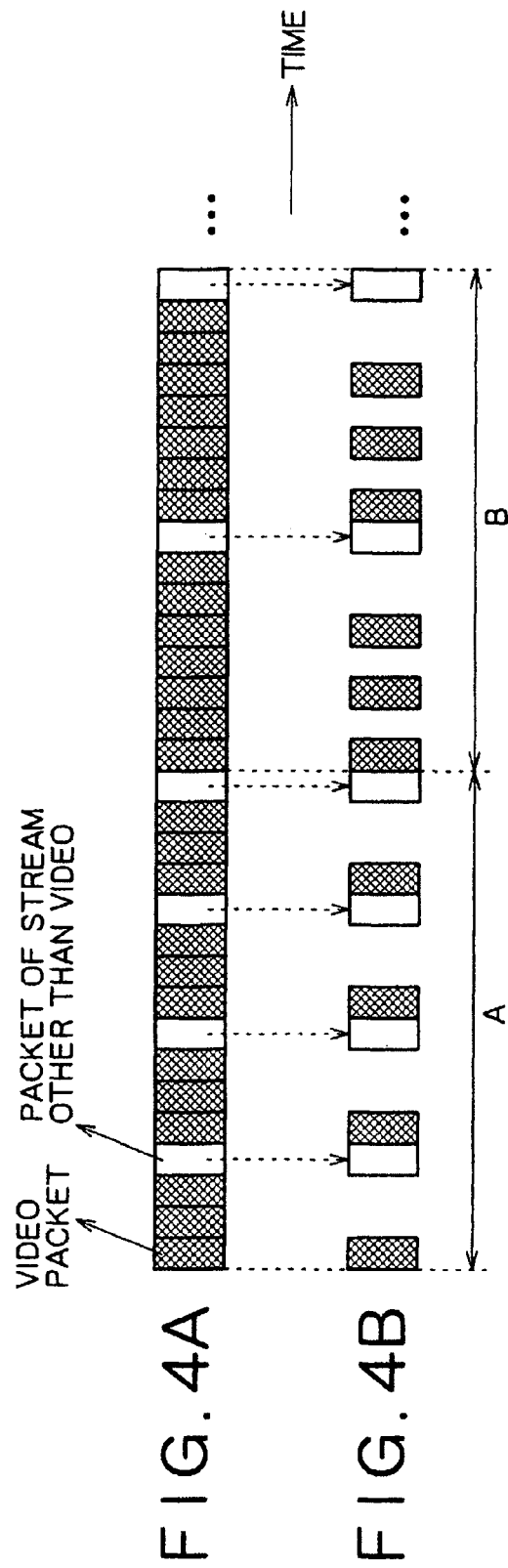
FIGS. 4A and 4B illustrate the operation of a multiplexer shown in FIG. 3.

FIGS. 4A and 4B schematically illustrate the above-mentioned processing to be executed by the multiplexer 16. FIG. 4A shows the timing of the input transport stream packets. In these figures, the cross-hatched portions indicate the video packets while the white portions indicate the stream packets other than video. As shown in FIG. 4A, the input transport stream packets are continuous; however, the data volume of the video data is reduced by the re-encoding of video data by the encoder 15. Consequently, the number of video packets is reduced.

As shown in FIG. 4B, the multiplexer 16 does not change the timing of the stream packets other than video but causes only the timing of the video packets to be different from the original state (shown in FIG. 4A).

Figure 5:
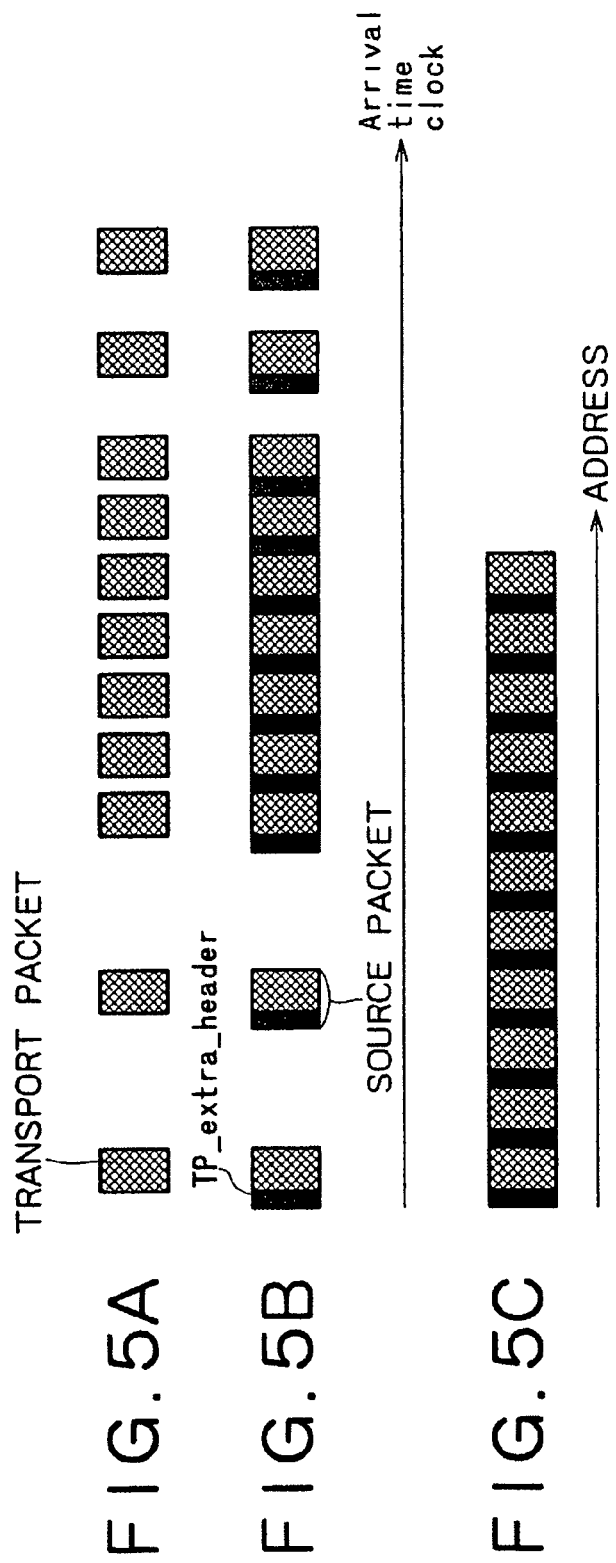
FIGS. 5A, 5B and 5C illustrate the processing by an arrival timestamp adding block.

As shown in FIGS. 5A, 5B and 5C, the arrival timestamp adding block 17 adds a header (TP_extra_header) including an arrival timestamp to each of the packets (FIG. 5A) of the input transport stream to generate a source packet (FIG. 5B), arranges the generated source packets continuously (FIG. 5C), and outputs them to a writing block 21. The arrival timestamp is information indicative of the timing with which the transport stream packets occur in a transport stream. The writing block 21 takes the input source packet stream consisting of continuous source packets and records the file to a recording medium 22. It should be noted that the recording medium 22 may be any type of recording medium.

The information output from the coding block 20 is also input in the writing block 21. On the basis of the video coding information from the coding controller 18, the coding block 20 generates multimedia display sub-information and outputs the same to the writing block 21. The multimedia display sub-information to be output to the writing block 21 is information for keeping the video display position and display size unchanged on multimedia plane from those of the image (the image which would be displayed without re-encoding) intended by the sending side even if the picture frame size has changed by transcoding (decoding by the decoder 14 and then encoding by the encoder 15) a video stream. This information also is used at the time of reproduction in combination with multimedia coding data.

Figure 6:
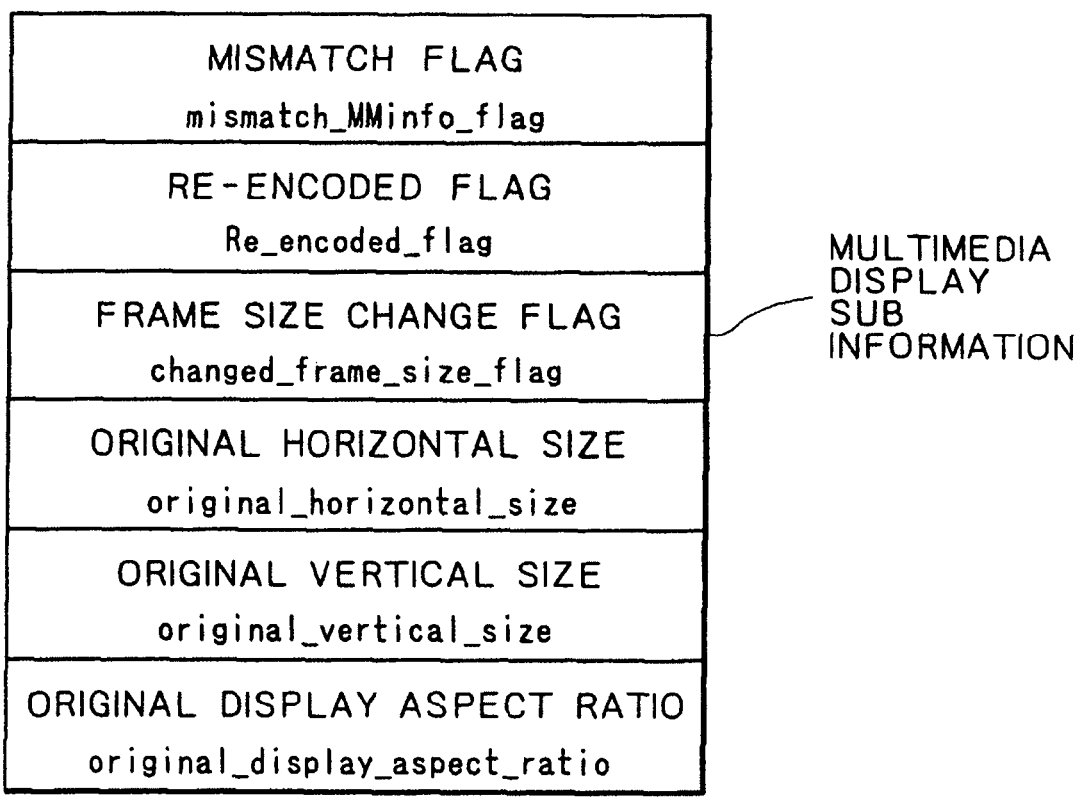
FIG. 6 illustrates multimedia display sub-information.

The following describes the multimedia display sub-information more specifically. As shown in FIG. 6, the multimedia display sub-information consists of three flags of a mismatch flag (mismatch_MMinfo_flag), a re-encoded flag (Re_encoded_flag), and a frame size change flag (changed_frame_size_flag), data associated with two sizes indicative of an original horizontal size (original_horizontal_size) and an original vertical size (original_vertical_size), and an original screen aspect ratio (original_display_aspect_ratio).

The mismatch flag indicates whether there exists a mismatch in the relationship between video and multimedia coding data. The re-encoded flag indicates whether the video has been re-encoded at the time of recording. The frame size change flag indicates whether the picture frame of video has been changed by re-encoding, for example. The original horizontal size indicates the horizontal size of a picture frame before re-encoding. The original vertical size indicates the vertical size of a picture frame before re-encoding. The original screen aspect ratio indicates the aspect ratio of a frame screen before re-encoding.

It should be noted that the above-mentioned multimedia display sub-information is illustrative only. Therefore, information other than that shown in FIG. 6 may be included in, or part of the information shown in FIG. 6 may be excluded from, the multimedia display sub-information.

The following describes another example of the multimedia display sub-information. In the following example, the multimedia display sub-information is stored in a ProgramInfo( ) syntax shown in FIG. 7. The following describes the fields associated with the present invention in the ProgramInfo( ) syntax.

"length" indicates the number of bytes between the byte just after the length field and the last byte of ProgramInfo( ) inclusive.

"num_of_program_sequences" indicates the number of program sequences in the an AV stream file. A source packet sequence with which the program contents specified by this format in the AV stream file are constant is referred to as a program sequence.

"SPN_program_sequences_start" indicates an address at which the program sequence starts in the AV stream file. "SPN_program_sequences_start" is of a size in unit of source packet number and counted from the initial value 0 starting with the first packet of the AV stream file.

"program_map_PID" is value of the PID of a transport packet having PMT (Program Map Table) applicable to that program sequence.

"num_of_streams_in_ps" indicates the number of elementary streams defined in that program sequence.

"stream_PID" indicates the value of the PID for the elementary stream defined in the PMT which is referenced by the program map PID of that program sequence.

"StreamCodingInfo( )" indicates the information about the elementary stream indicated by the above-mentioned stream PID.

FIG. 8 shows the syntax of StreamCodingInfo( ). "length" indicates the number of bytes between the byte just after this length field and the last byte of StreamCodingInfo( ) inclusive.

"stream_coding_type" indicates the coding type of the elementary stream indicated by the stream PID for this StreamCodingInfo( ). The meanings of the individual types are shown in FIG. 9.

If the value of stream coding type is 0x02, it indicates that the elementary stream indicated by the stream PID is a video stream.

If the value of stream coding type is 0x0A, 0x0B, or 0x0D, it indicates that the elementary stream indicated by the stream PID is multimedia coding data.

If the value of stream coding type is 0x06, it indicates that the elementary stream indicated by the stream PID is subtitles or teletext.

"video_format" indicates the video format of a video stream indicated by the stream PID for this StreamCodingInfo( ). The meanings of the individual video formats are shown in FIG. 10.

In FIG. 10, 480i indicates video display of NTSC standard TV (interlace frame of 720 pixels×480 lines). 576i indicates video display of PAL standard TV (interlace frame of 720 pixels×576 lines). 480p indicates video display of progressive frame of 720 pixels×480 lines. 1080i indicates video display of interlace frame of 1920 pixels×1080 lines. 720p indicates video display of progressive frame of 1230 pixels×720 lines.

"frame_rate" indicates the frame rate of a video stream indicated by the stream PID for this StreamCodingInfo( ). The meanings of the individual frame rates are shown in FIG. 11.

"display_aspect_ratio" indicates the display aspect ratio of a video stream indicated by the stream PID for this StreamCodingIndo( ). The meaning of the individual display aspect ratios are shown in FIG. 12.

"original_video_format_flag" indicates whether there exists original video format and original display aspect ratio in this StreamCodingInfo( ).

"original_video_format" indicates a video format before a video stream indicated by the stream PID for this StreamCodingInfo( ) is coded. The meanings of the individual original video formats are the same as shown in FIG. 10.

"original_display_aspect_ratio" is the display aspect ratio before a video stream indicated by the stream PID for this StreamCodingInfo( ) is coded. The meanings of the individual aspect ratios are the same as shown in FIG. 12.

It is assumed that, in transcoding a transport stream with a multimedia data stream (BML stream or subtitles) multiplexed along with a video stream, the re-encoding of the video stream changes its video format (for example, from 1080i to 480i), while the multimedia data stream retains its original stream contents. In this case, a mismatch in information may occur between a new video stream and the multimedia data stream. For example, although the parameters associated with the display of the multimedia data stream are determined on the supposition of the video format of the original video stream, the video format may be changed by the re-encoding of the video stream.

The video format of the original video stream is indicated by the video format and the display aspect ratio. The video format of the re-encoded video stream is indicated by the original video format and the original display aspect ratio.

If a mismatch exists between the values of the video format and the original video format and/or between the display aspect ratio and the original display aspect ratio, it indicates that a video format change has been caused by the video re-encoding at the time of recording.

If the stream PID in which the stream coding type indicates multimedia coding data and subtitles are included in ProgramInfo( ), it indicates that the multimedia data is multiplexed in an AV stream file (a transport stream).

If ProgramInfo( ) indicates that a video format change has been caused by the re-encoding of video at the time of recording and multimedia data is multiplexed in the AV stream file, then it is determined that a mismatch exists in display between the video stream (re-encoded) and the multimedia data (the original multimedia data) in the AV stream file.

In such a case, the information about the original video stream, namely the original video format and the original display aspect ratio, becomes effective. The reproducing apparatus generates a display screen from the above-mentioned new video stream and multimedia data stream as follows.

The video stream is up-sampled to a video format indicated by the original video format and the original display aspect ratio.

The up-sampled image and the multimedia data stream are synthesized to form a correct display screen.

The multimedia display sub-information generated by the coding block 20 is recorded by the writing block 21 to the recording medium 22 but stored as a file which is different from the source packet stream file output from the arrival timestamp adding block 17. If the multimedia display sub-information is recorded by the writing block 21 to the recording medium 22 as a file different from the source packet stream file, the filed multimedia display sub-information is output from the coding block 20.

Figure 13:
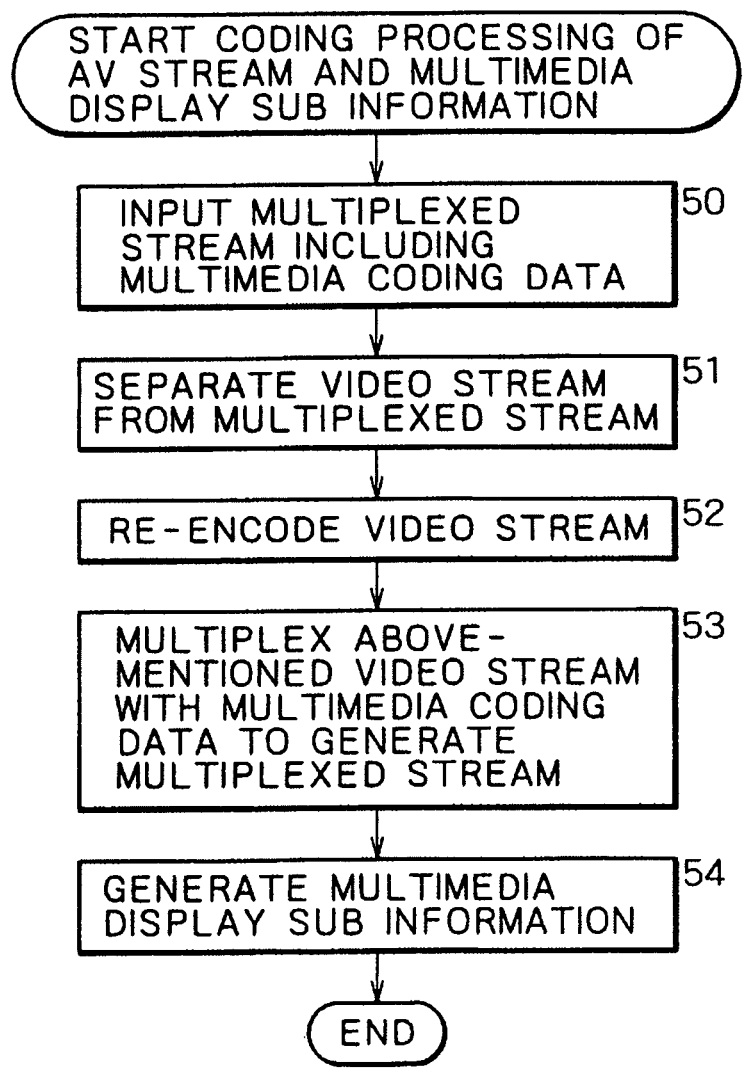
FIG. 13 is a flowchart describing the processing of coding AV stream and multimedia display sub-information.

FIG. 13 is a flowchart describing the processing of coding an AV stream and multimedia display sub-information.

In step 50, a multiplexed stream including multimedia coding data is input in the recording apparatus 1.

In step 51, the demultiplexer 12 separates the video stream from the multiplexed stream.

In step 52, the encoder 15 re-encodes the video stream decoded by the decoder 14.

In step 53, the multiplexer 16 multiplexes the above-mentioned video stream and multimedia coding data to generate a multiplexed stream.

In step 54, the coding block 20 generates multimedia display sub-information.

In the above description, the coding controller 18 generates the coding control information including bit rate and picture frame on the basis of the input data. The coding controller 18 may generate the following information as alternative coding control information. Namely, if the input transport stream is found to include multimedia coding data by the analyzing block 13, then the coding controller 18 may generate coding control information when encoding is executed by the encoder 15 for instructing the encoder 15 to execute the re-encoding with a picture frame (the picture frame before re-encoding) of the same size as that of the picture frame of the original video, and output the generated coding control information to the encoder 15.

When the above-mentioned method is used, the encoder 15 re-encodes the video data supplied from the decoder 14 with the same value as that of the picture frame of the original video stream on the basis of the input coding control information. If such coding control information is generated and the re-encoding is executed on the basis of the coding control information, no picture frame change is caused by the re-encoding, thereby preventing a mismatch from occurring in the relationship between the video stream obtained by re-encoding and the multimedia coding data.

Still alternatively, the following information may be generated as the coding control information generated by the coding controller 18. Namely, if the input transport stream is found to include multimedia coding data by the analyzing block 13, then the coding controller 18 may generate coding control information when encoding is executed by the encoder 15 for instructing the encoder 15 to execute the re-encoding under the same conditions as the video format (shown in FIG. 10) and screen aspect ratio (shown in FIG. 12) of the original video, and output the coding control information to the encoder 15.

When the above-mentioned method is used, the encoder 15 re-encodes the video supplied from the decoder 14 under the same conditions as the video format (shown in FIG. 10) and screen aspect ratio (shown in FIG. 12) of the original video on the basis of the input coding control information. If such coding control information is generated and the re-encoding is executed on the basis of the coding control information, no video format and no screen aspect ratio change is caused by the re-encoding, thereby preventing a mismatch from occurring in the relationship between the video stream obtained by re-encoding and the multimedia coding data.

Figure 14:
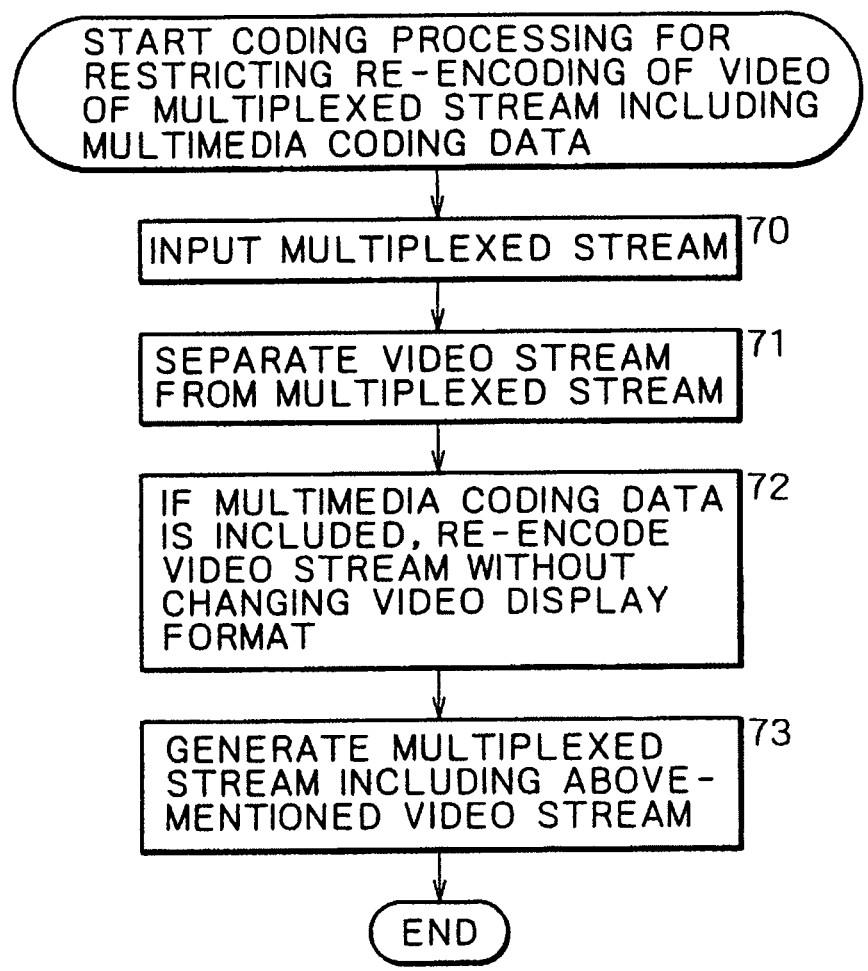
FIG. 14 is a flowchart describing the coding processing to be executed for restricting the re-encoding of a multiplexed stream video including multimedia coding data.

FIG. 14 is a flowchart describing the coding for restricting the re-encoding of the video of a multiplexed stream including multimedia coding data.

In step 70, a multiplexed stream is input in the recording apparatus 1.

In step 71, the demultiplexer 12 separates the video stream from the multiplexed stream.

In step 72, the analyzing block 13 checks if the multimedia coding data is included in the video stream. If the multimedia coding data is included, the analyzing block 13 sends the coding control information to the encoder 15 instructing the same to re-encode the video stream without changing the display format. On the basis of the supplied control information, the encoder 15 re-encodes the video stream.

In step 73, the multiplexer 16 generates a multiplexed stream including the above-mentioned video stream.

With reference to FIGS. 15 through 20, the following describes one example of control to be executed on the basis of the coding control information.

Figure 15:
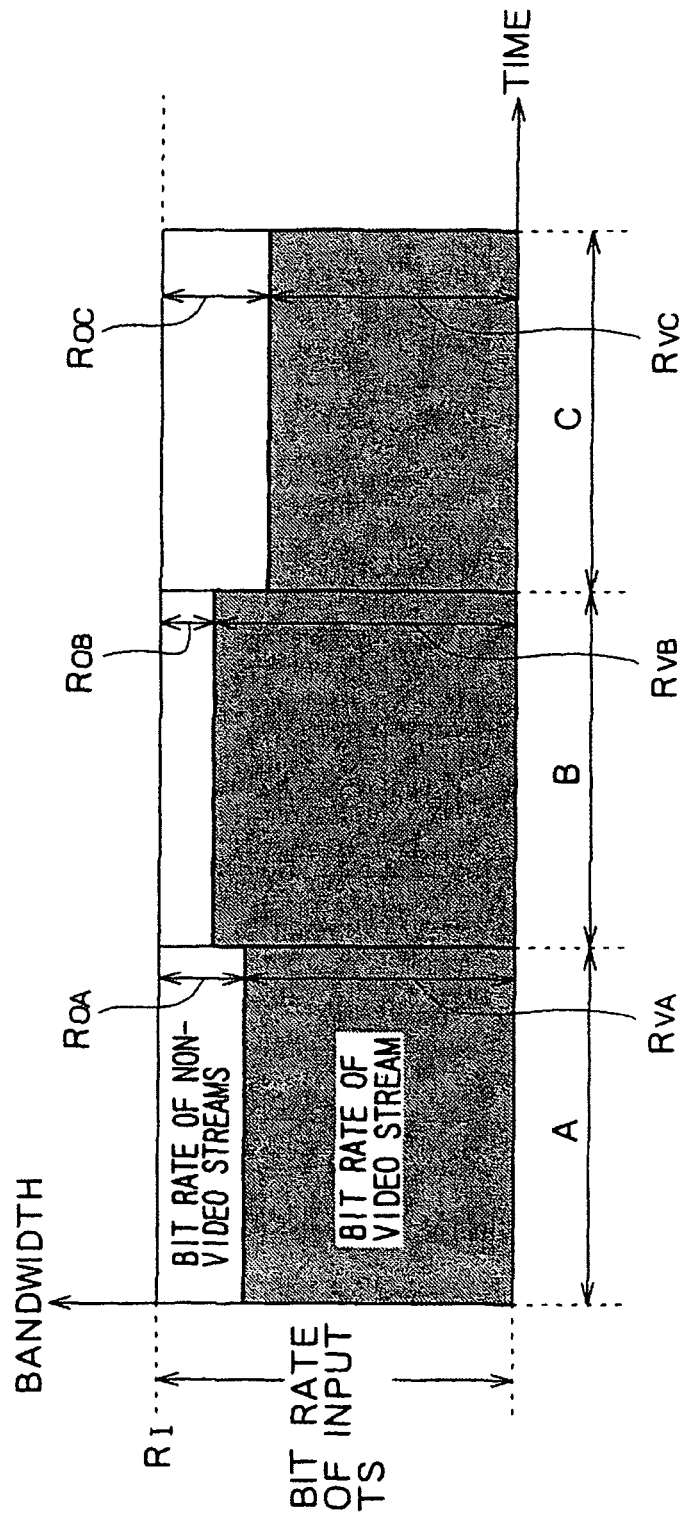
FIG. 15 illustrates an example of an input transport stream.

It is assumed here that a transport stream to be input to the selector 10 has a constant bit rate $R_I$ as shown in FIG. 15, for example. The video stream and the non-video streams are coded by variable bit rates. In the example shown in FIG. 15, in unit time (for example, GOP) A, the bit rate of the video stream is $R_{VA}$ and the bit rate of non-video streams is $R_{OA}$. In unit time B, the bit rate of the video stream is $R_{VB}$ and the bit rate of non-video streams is $R_{OB}$. In unit time C, the bit rate of the video stream is $R_{VC}$ and the bit rate of non-video streams is $R_{OC}$.

Figure 16:
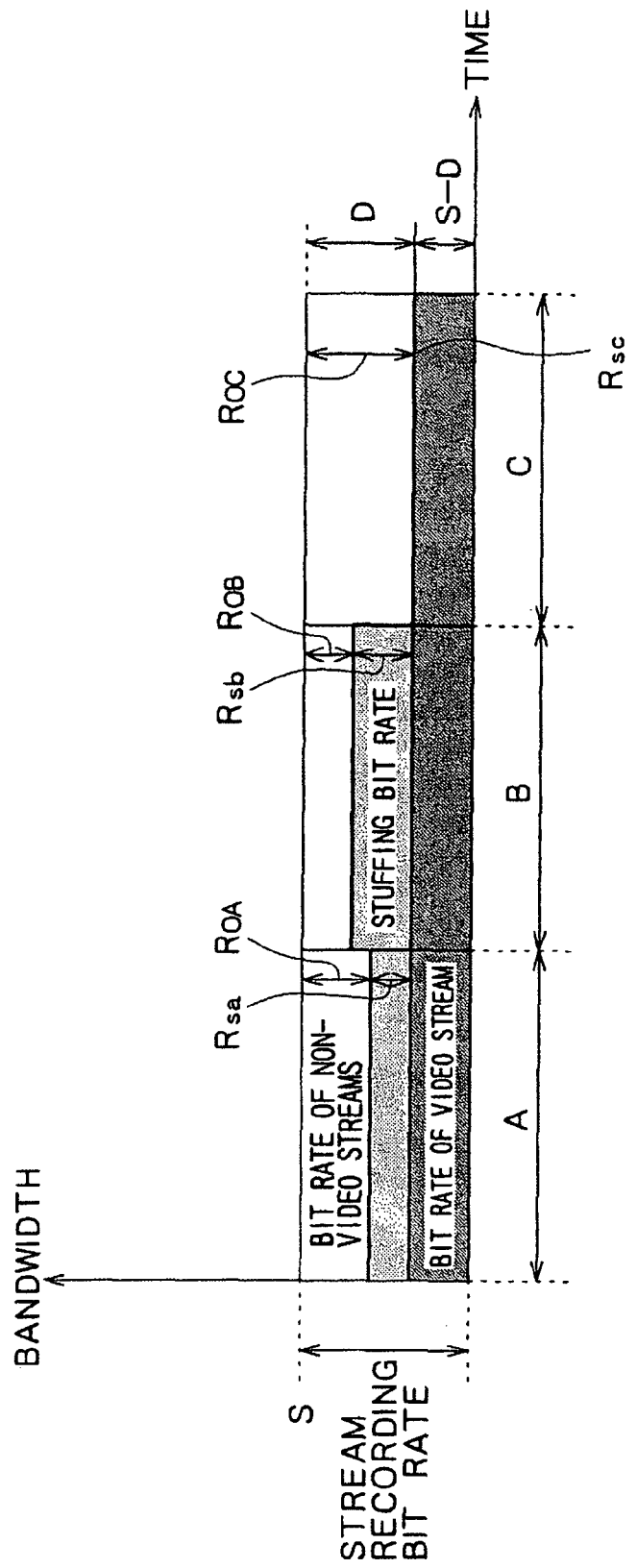
FIG. 16 illustrates an example of a transport stream after the re-encoding of the video stream shown in FIG. 15.
Figure 17:
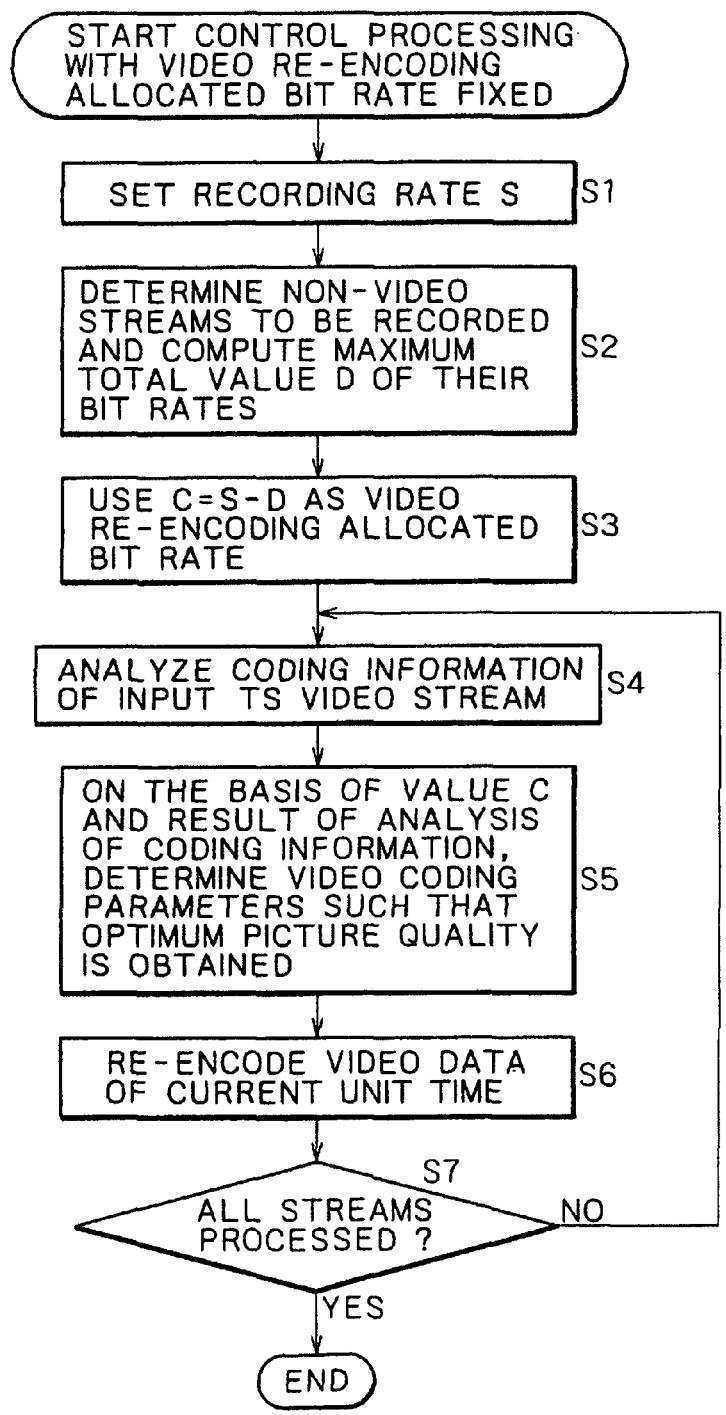
FIG. 17 is a flowchart describing a recording rate control process by a recording apparatus shown in FIG. 3.

If the transport stream as shown in FIG. 15 is re-encoded to output the transport stream having fixed bit rate S (S<$R_I$) as shown in FIG. 16 from the multiplexer 16, the coding controller 18 executes the processing described by the flowchart shown in FIG. 17.

First, in step S1, the coding controller 18 sets the bit rate to S (recording rate) of a transport stream to be output from the multiplexer 16 on the basis of a control signal input from a controller, not shown, via the terminal 19. Next, in step S2, the coding controller 18 determines non-video streams to be recorded and computes a maximum total value D of the bit rates of the determined streams.

The maximum value D is determined from the stream specification of the input transport stream. For example, if two audio streams are to be recorded in addition to the video stream, the maximum value D is 384×2 Kbps since the maximum value of the bit rate of one audio stream is 384 Kbps according to the Japanese digital BS broadcast stream specification.

In step S3, the coding controller 18 uses value C obtained by subtracting the maximum value D computed in step S2 from the recording bit rate set in step S1 (C=S−D), as a bit rate to be allocated to the re-encoding of the video data. In step S4, the coding controller 18 analyzes the coding information such as the video stream bit rate and picture frame from the video stream information output from the decoder 14.

In step S5, the coding controller 18 determines, on the basis of the value C computed in step S3 and the video stream coding information analyzed in step S4, a video coding parameter (video coding control information) such that an optimum picture quality is achieved.

For example, in the example shown in FIG. 16, value S is ½ of value $R_I$. In the present example, the bit rate of steams other than video is the maximum value D, which is used without change as the bit rate of non-video steams in a multiplexed stream after re-encoding.

Then, video coding parameters are determined such that an optimum picture quality can be achieved within the range of (S−D). If the picture frame is controlled, the horizontal direction of a picture frame of 720×480 pixels, for example, is sampled by ½ into 360×480 pixels. The determined, coding parameters (bit rate and picture angle) are supplied to the encoder 15 as video coding control information.

In step S6, on the basis of the video coding control information supplied from the coding controller 18, the encoder 15 re-encodes the video data of unit time (in this example, unit time A) to be processed now. In the example shown in FIG. 16, the actual bit rate $R_{OA}$ is smaller than the maximum value D in unit time A; however, since the maximum value D is fixed, the video allocated bit rate becomes (S−D). A wasted portion Rsa which cannot be used for video coding occurs because the maximum value D is fixed. The wasted portion is filled with stuffing bits.

In step S7, the coding controller 18 determines whether there remains any stream to be re-encoded. If any streams remain to be re-encoded, the procedure returns to step S4 to repeat the above-mentioned processes.

If, in step S7, no more streams remain to be re-encoded, this processing comes to an end.

Thus, in the example shown in FIG. 16, in unit time B, the bit rate of non-video streams also is D and the video stream allocated bit rate is S−D because it is fixed. Stuffing bits are inserted in value $R_{sb}$ ($R_{sb}$=S−(S−D)−$R_{OB}$=D−$R_{OB}$).

In unit time C, too, the bit rate of non-video streams is D and the video stream allocated bit rate is S−D. It should be noted that, in unit time C, D=$R_{OC}$, so that no stuffing bits exist.

Thus, in the example shown in FIG. 16, the video stream is coded with a fixed bit rate.

Figure 18:
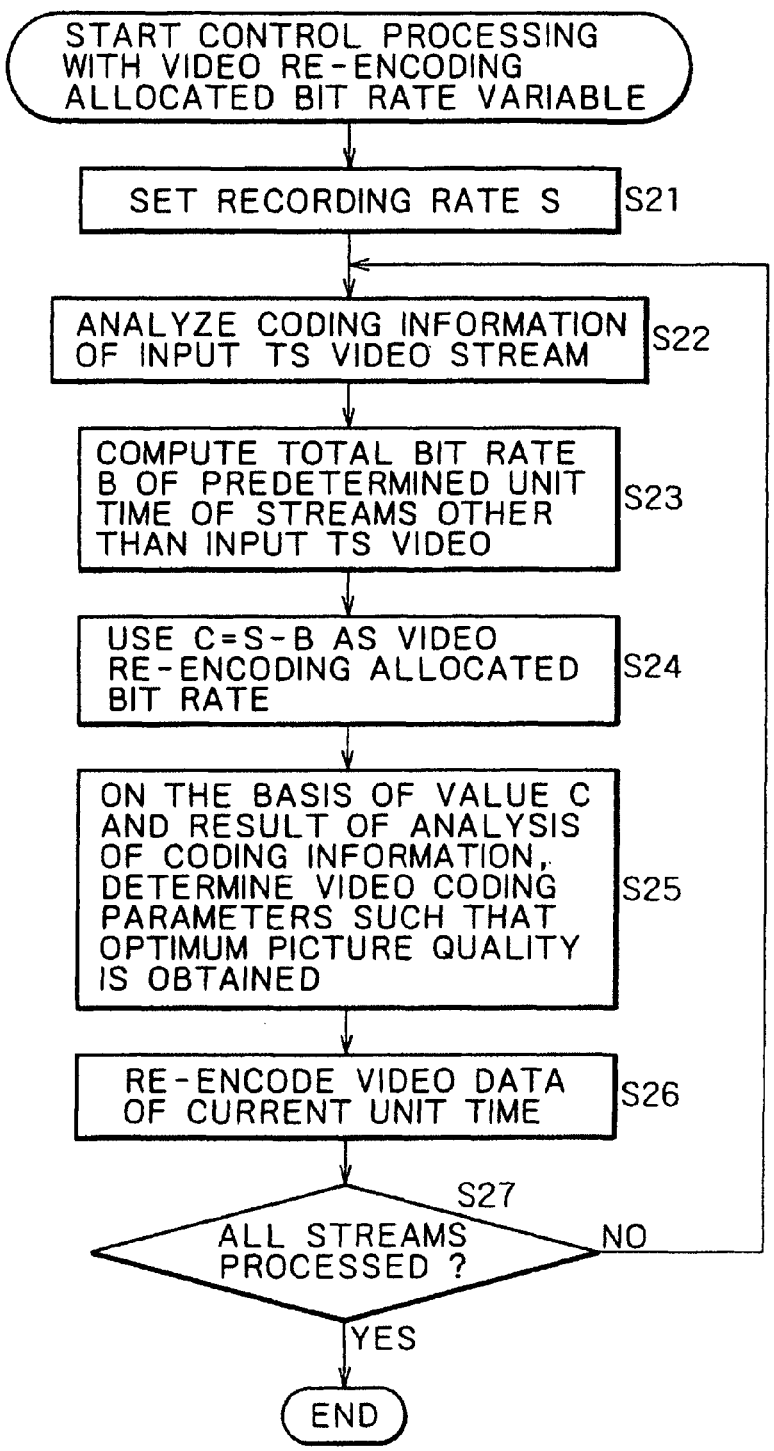
FIG. 18 is a flowchart describing another recording rate control process by the recording apparatus shown in FIG. 3.

FIG. 18 is a flowchart describing a processing example in which the video re-encoding allocated bit rate is variable. First, in step S21, the coding controller 18 sets recording rate S on the basis of the information supplied via the terminal 19. Next, in step S22, the coding controller 18 analyzes the coding information of the video stream on the basis of the video stream information supplied from the decoder 14. The processes of steps S21 and S22 are the same as those of steps S1 and S4 of FIG. 17.

In step S23, the coding controller 18 computes, from the output of the analyzing block 13, the total bit rate B in each unit time of non-video streams.

In step S24, the coding controller 18 uses, as the video re-encoding allocated bit rate, value C (C=S−B) obtained by subtracting value B obtained in step S23 from value S obtained in S1.

In step S25, the coding controller 18 determines, on the basis of value C obtained in step S24 and a result of analysis of the video stream coding information obtained in step S22, video coding parameters such that an optimum picture quality is obtained. The determined coding parameters are output to the encoder 15.

Figure 19:
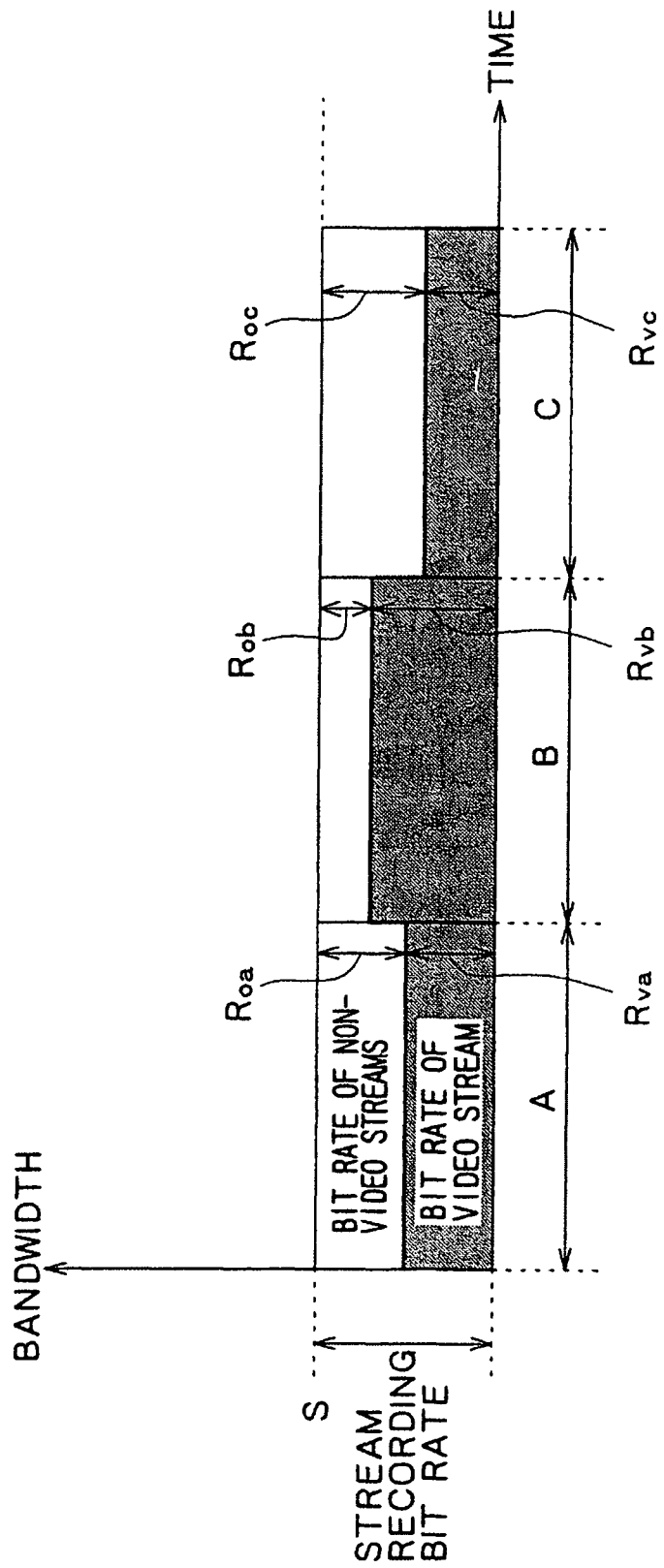
FIG. 19 illustrates another example of a transport stream resulting from the re-encoding of the video stream.

In step S26, the encoder 15 re-encodes the video data of the current unit time on the basis of the coding parameters determined in step S25. Consequently, as shown in FIG. 19, for example, after allocation of $R_{oa}$ ($=R_{OA}$) as the bit rate in unit time of non-video streams, the bit rate of the video stream is set to bit rate $R_{va}$ specified by ($S-R_{oa}$).

In step S27, the coding controller 18 determines whether any streams remain to be processed. If any streams remain to be processed, the procedure returns to step S22 to repeat the above-mentioned processes. If no more streams remain to be processed, this processing comes to an end.

Thus, in unit time B, after allocation of bit rate $R_{ob}$ ($=S-R_{OB}$) of non-video streams, the remaining $R_{vb}$ ($=S-R_{ob}$) is the bit rate of the video stream. In unit time C, the bit rate of the video stream is set to $R_{vc}$ ($=S-R_{OC}$), except for bit rate Roc of non-video streams.

Thus, in the present processing example, the bit rate of the video stream is variable and, therefore, no stuffing bit is needed or the number of stuffing bits can be reduced, thereby coding the video stream more efficiently.

Figure 20:
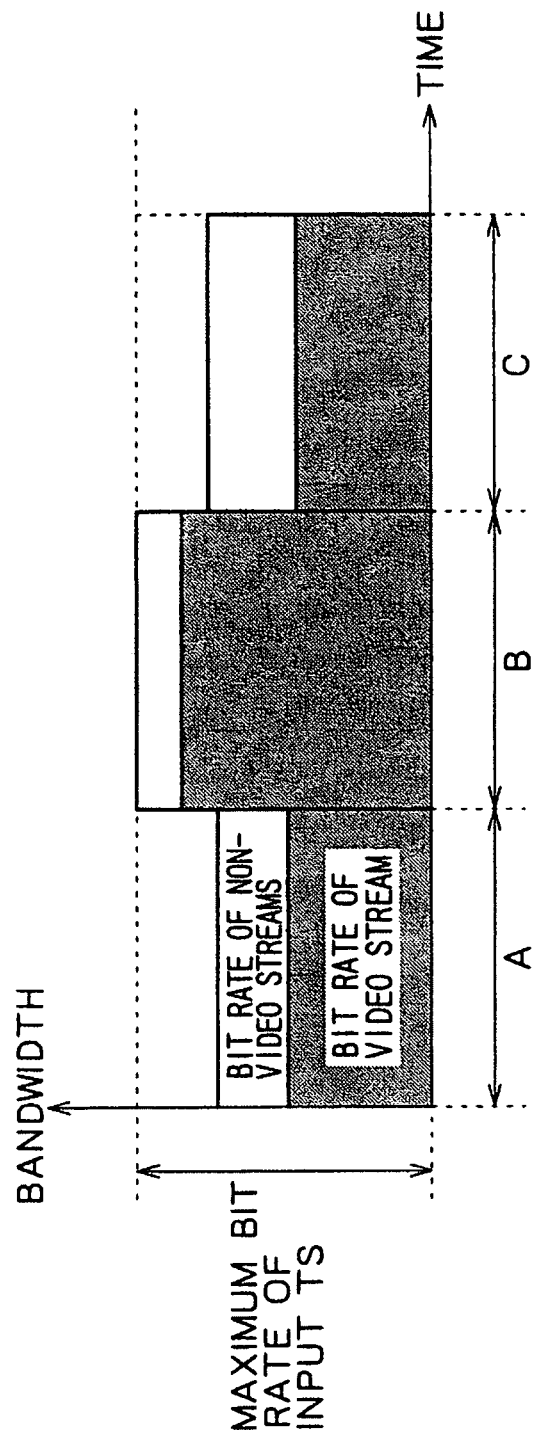
FIG. 20 illustrates another example of the input transport stream.

In the above, the input transport stream has a fixed bit rate. The present invention also is applicable to an example in which the bit rate of the input transport stream is variable as shown in FIG. 20.

Consequently, a transport stream of longer content can be recorded to the recording medium 22 at a lower bit rate as required.

In addition, the above-mentioned novel embodiment prevents the qualities of audio data, still picture and character graphics data, multimedia coding data, and other non-video data from being conspicuously deteriorated. The non-video data is basically smaller in data volume than video data, so that reducing the bit rate of the non-video data in the same ratio as the bit rate of video data makes the effects on the non-video data relatively greater than those on video data. The novel embodiment can prevent these effects from being caused.

Figure 21:
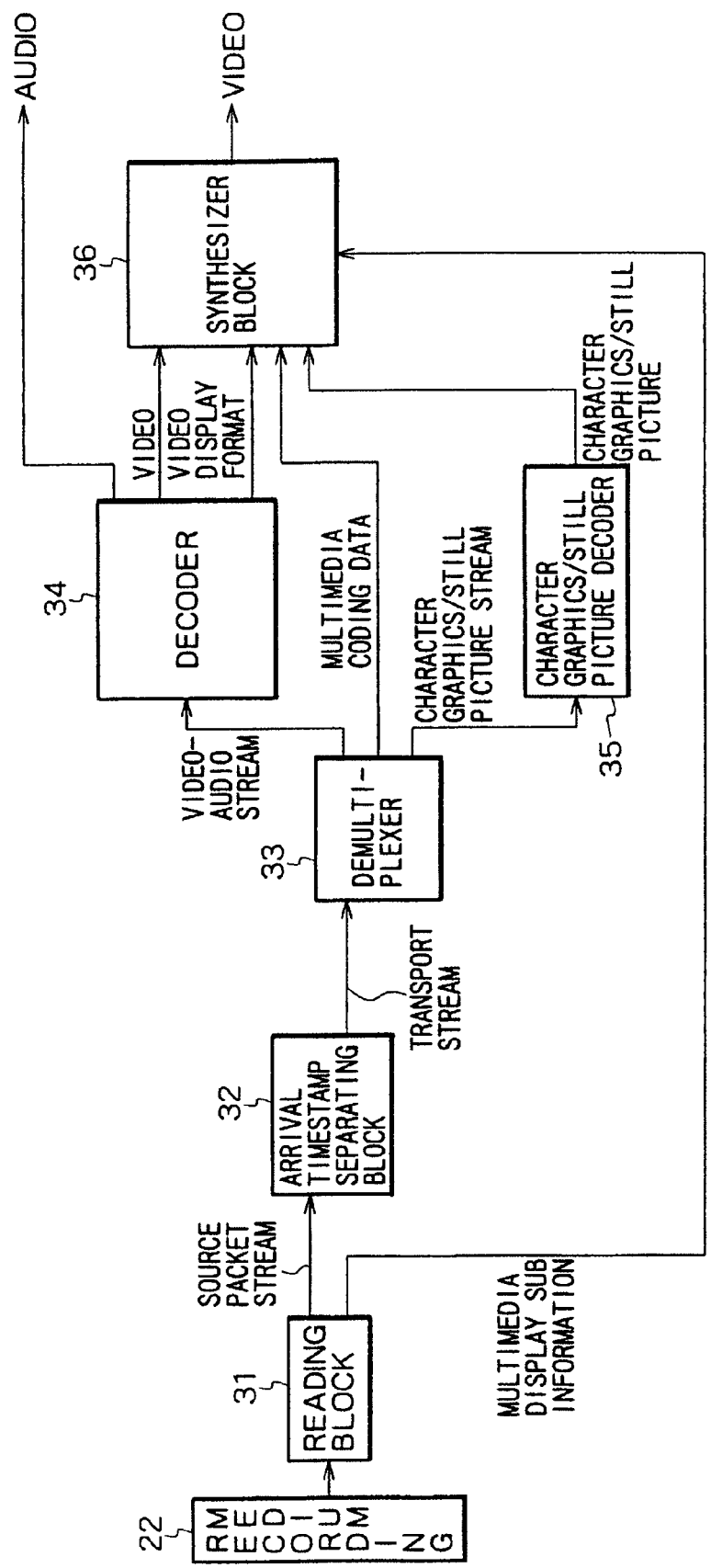
FIG. 21 is a block diagram illustrating a configuration of a reproducing apparatus practiced as one embodiment of the present invention.

The following describes the reproduction of a source packet stream file recorded on the recording medium 22. Referring to FIG. 21, there is shown a block diagram illustrating the configuration of a reproducing apparatus practiced as one embodiment of the invention. A source packet stream file recorded on the recording medium 22 is read by a reading block 31. The reading block 31 also reads multimedia display sub-information recorded on the recording medium 22 as a file separate from the source packet stream file.

The source packet stream read by the reading block 31 is output to a arrival timestamp separating block 32 and the multimedia display sub-information is output to a synthesizing block 36. The arrival timestamp separating block 32 incorporates a reference clock. The arrival time stamp separating block 32 compares the reference clock with the value of the arrival timestamp added to the source packet of the input source packet stream and, when a match is found, removes the arrival timestamp from the source packet having the matching arrival timestamp, outputting the resultant packet to a demultiplexer 33 as a transport stream packet.

The demultiplexer 33 separates the input transport stream into a video/audio stream and data streams such as multimedia coding data, character graphics, text, and still picture. Of these separated data, the video/audio stream is output to an AV decoder 34, the multimedia coding data is output to the synthesizing block 36, and the data stream such as character graphics, text, and still picture is output to a character graphics/still picture decoder 35.

The AV decoder 34 separates the input video/audio stream into video data and audio data, decodes each data, and outputs the decoded audio data to an audio reproducing device, not shown, and the decoded video data to the synthesizing block 36. The character graphics/still picture decoder 35 decodes the input data stream, such as character graphics, text, and still picture, and outputs the decoded character graphics data, text data, and still picture data to the synthesizing block 36.

In the synthesizing block 36, the video data from the AV decoder 34, the multimedia coding data from the demultiplexer 33, the data from the character graphics/still picture decoder 35, and the multimedia display sub-information from the reading block 31 are input. Checking the mismatch flag (FIG. 6) of the input multimedia display sub-information, the synthesizing block 36 determines whether a mismatch exists in the relationship between the input video signal and the multimedia coding data.

If a mismatch exists between the value of video format and the value of original video format shown in FIG. 8 and/or a mismatch exists between the value of display aspect ratio and the original display aspect ratio, the synthesizing block 36 determines that a video format change has been caused by the video re-encoding at the time of recording, detecting a mismatch in the relationship between the input video signal and the multimedia encoding data. If no mismatch exists between the value of video format and the value of original video format and no mismatch exists between the value of display aspect radio and the value of original display aspect ratio, the synthesizing block 36 determines that no mismatch exists in the relationship between the input video signal and the multimedia coding data.

If a mismatch is found in the relationship between the input video signal and the multimedia coding data, the synthesizing block 36 further references the original horizontal size and vertical size of the multimedia display sub-information or references the original video format and the original display aspect ratio. Then, the synthesizing block 36 scale-converts the input video signal so that it can be displayed in a frame of the referenced size. On the basis of the multimedia coding data, the synthesizing block 36 outputs the video signal with the scale-converted video signal and the data, such as character graphics synthesized on a multimedia plane, to a television receiver, not shown, which serves as a display device.

On the other hand, if no mismatch is found in the relationship between the input video signal and the multimedia coding data, the synthesizing block 36 synthesizes the input video signal with other data on a multimedia plane without scale conversion and outputs the synthesized data.

Thus, recording the multimedia display sub-information and using it at the time of reproduction allow the receiving side to display a screen as intended on the sending side. Referring to FIG. 22, if the re-encoding on the sending side (recording side) results in a smaller video picture frame than the original, the size reduction is recorded as multimedia display sub-information, which is referenced at the time of reproduction. Consequently, because there exists no mismatch between video data and other data, the receiving side (the reproduction side) can display the same screen as the original.

Figure 24:
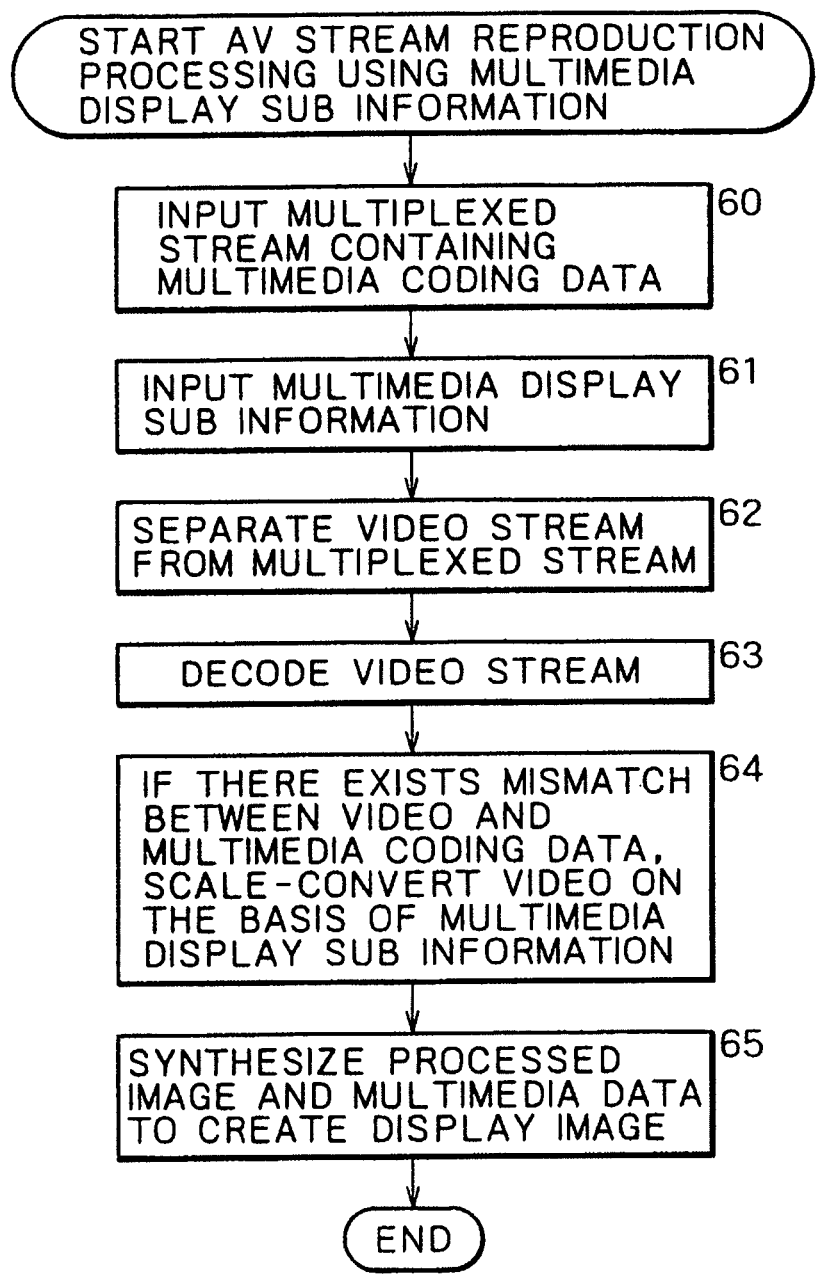
FIG. 24 is a flowchart describing the processing of reproducing an AV stream which uses multimedia display sub-information.

FIG. 24 is a flowchart describing AV stream reproduction processing which uses multimedia display sub-information.

In step 60, a multiplexed stream including multimedia coding data is read from a recording medium and input in a reproduction device.

In step 61, multimedia display sub-information is input. This information is read from the recording medium in the case of the reproducing device shown in FIG. 21; in the case of a reproducing device shown in FIG. 25, this information is separated from the multiplexed stream.

In step 62, a video stream is separated from the multiplexed stream.

In step 63, the video stream is decoded.

In step S64, if a mismatch exists between the video data and the multimedia coding data, the synthesizing block 36 scale-converts the video data on the basis of the multimedia display sub-information.

In step 65, the synthesizing block 36 synthesizes the processed image and the multimedia data to generate a display image.

Figure 23:
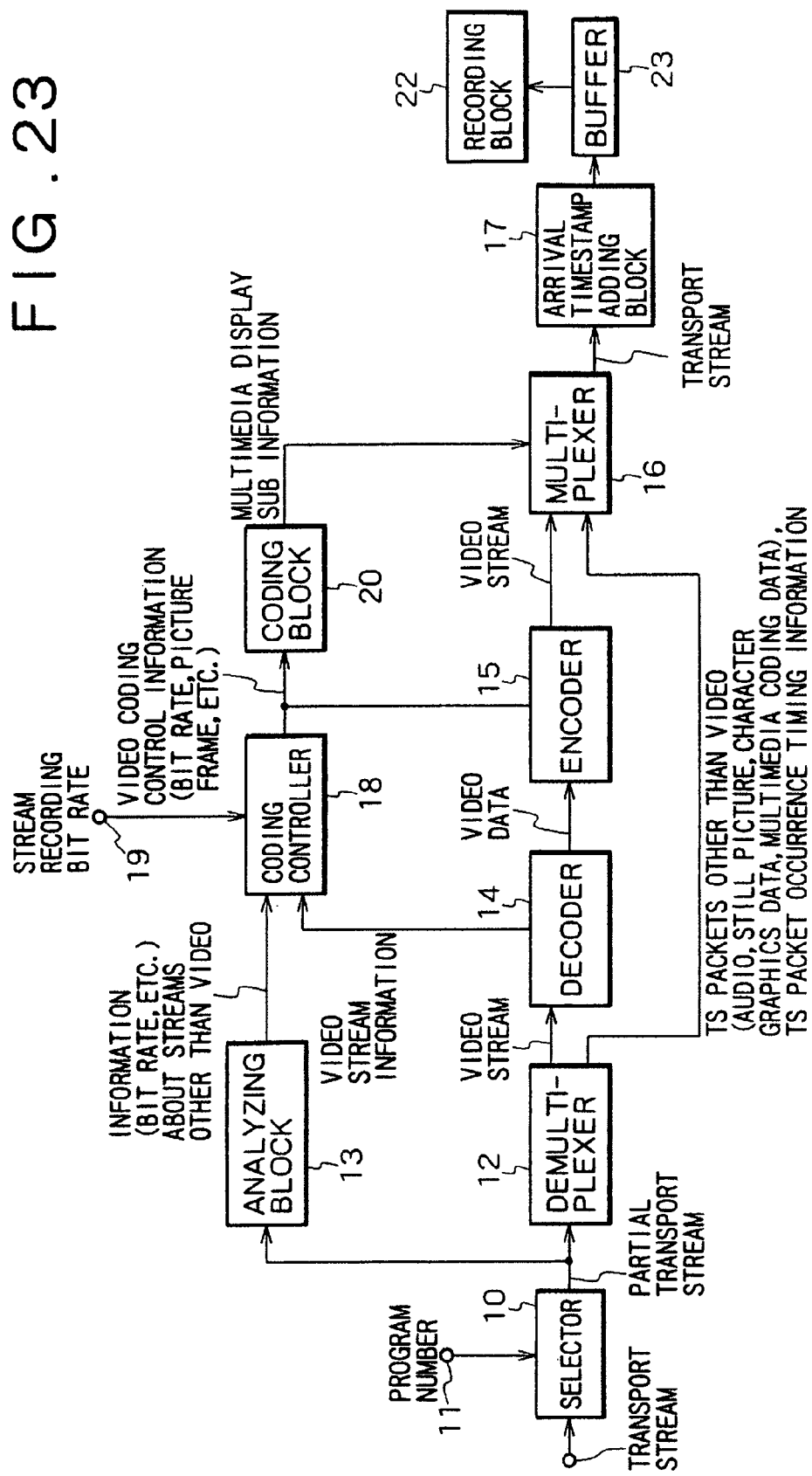
FIG. 23 is a block diagram illustrating another configuration of the recording apparatus practiced as one embodiment of the present invention.

As described, the multimedia display sub-information may be recorded on the recording medium 22 as a file which is different from the source packet stream file containing character graphics data and video signals. Alternatively, the multimedia display sub-information may be embedded in a source packet stream file and then recorded on the recording medium 22. FIG. 23 shows the configuration of the recording apparatus 1 in which the multimedia display sub-information is embedded in a source packet stream file.

In comparison between the configuration of the recording apparatus 1 shown in FIG. 23 and the configuration shown in FIG. 3, the former outputs the multimedia display sub-information output from the coding block 20 and supplies this output to the multiplexer 16. The multiplexer 16 then generates a transport packet of the input multimedia display sub-information and embeds it into a source packet stream file, outputting the same to the arrival timestamp adding block 17. Instead of embedding the multimedia display sub-information into a source packet stream file as a transport packet, the multimedia display sub-information may be written to a user data area in an MPEG video stream.

In the present embodiment of the invention, video data may be re-encoded using other methods than that described above; for example, an input video stream may be converted in the DCT area to convert the coding parameters such as picture frame.

Figure 25:
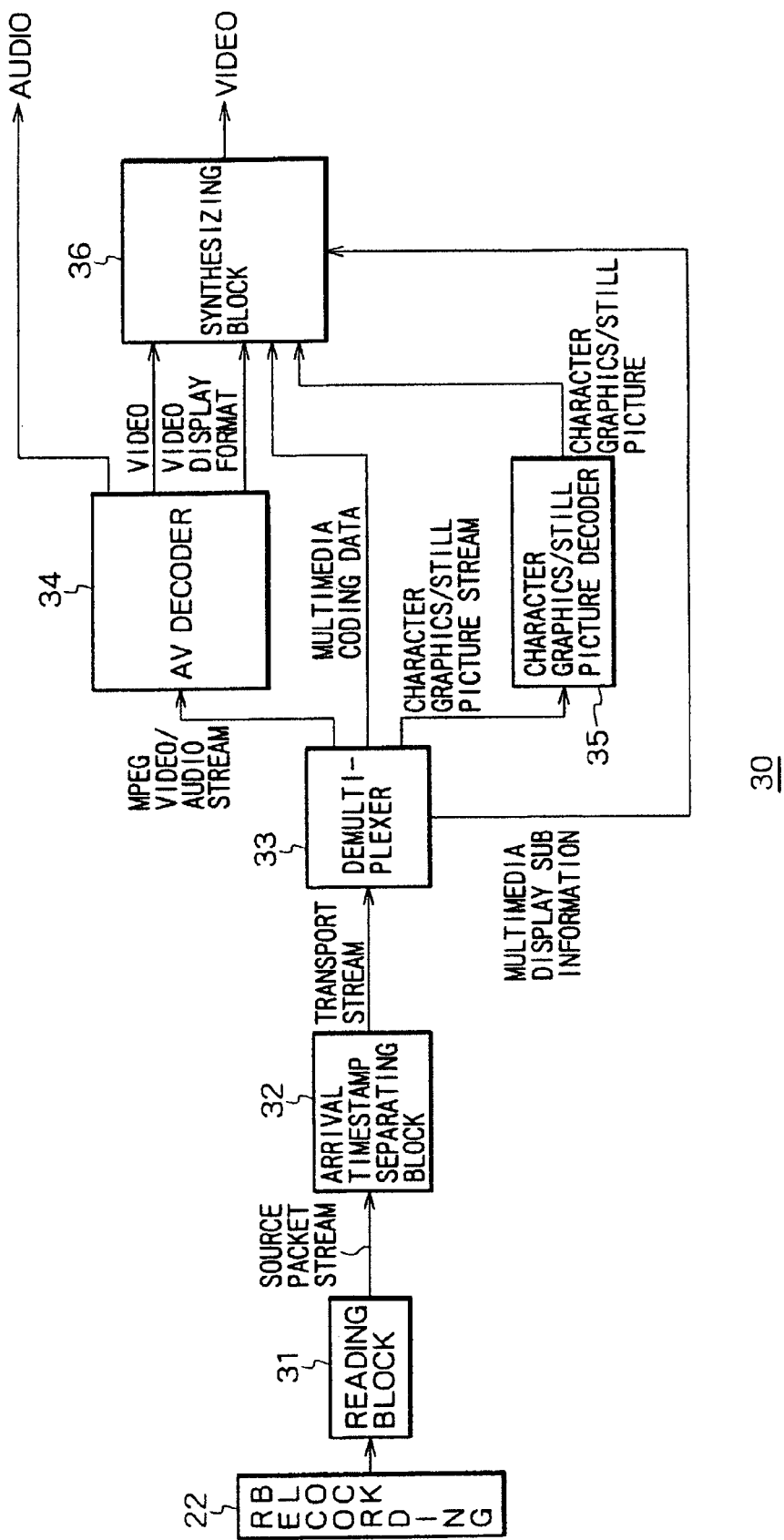
FIG. 25 is a block diagram illustrating another configuration of the reproducing apparatus practiced as one embodiment of the present invention.

FIG. 25 shows the configuration of the reproducing apparatus 30 in which the multimedia display sub-information is embedded in a source packet stream file to be recorded on the recording medium 22. In comparison between the configuration of the reproducing apparatus shown in FIG. 25 and the configuration shown in FIG. 21, the former reads only the source packet stream through the reading block 31. The source packet stream read by the reading block 31 is input to the demultiplexer 33 via the arrival timestamp separating block 32.

The demultiplexer 33 extracts the multimedia display sub-information from the input source packet stream file and outputs the extracted information to the synthesizing block 36. The further processing is the same as that of the configuration shown in FIG. 5.

Thus, if the multimedia display sub-information is recorded as embedded in a source packet stream file, the receiving side can also obtain the video picture size and display position intended by the sending side.

In the present embodiment of the invention, a transport stream was used as an example. The present invention also is applicable to multiplexed streams such as a program stream.

The above-described sequence of processing operations can be executed by hardware as well as software. In the software approach, the recording apparatus 1 (and the reproducing apparatus 30) is constituted by a personal computer as shown in FIG. 26.

Referring to FIG. 26, a CPU (Central Processing Unit) 101 executes various processing operations as instructed by programs stored in a ROM (Read Only Memory) 102 or loaded from a storage block 108 into a RAM (Random Access Memory) 103. The RAM 103 also stores, as required, the data necessary for the CPU 101 to execute various processing operations.

The CPU 101, the ROM 102, and the RAM 103 are interconnected via a bus 104. The bus 104 also is connected to an input/output interface 105.

The input/output interface 105 is connected to an input block 106, such as a keyboard and a mouse, a display device such as a CRT or LCD, an output block 107, such as a speaker, a storage block 108 such as hard disk, and a communication block 109 such as modem or terminal adapter. The communication block 109 executes communication processing via a network.

The input/output interface 105 also is connected to a drive 110, as required, in which a magnetic disc 121, an optical disc 122, a magneto-optical disc 123, or a semiconductor memory 124 is loaded. Computer programs read from these storage media are installed in the storage block 108 as required.

The execution of a sequence of processing operations by software requires the use of a computer having a dedicated hardware device storing beforehand the programs constituting the software or a general-purpose computer in which these programs are installed, as required, from a recording medium.

The program recording medium for storing computer-readable and executable programs may be a package medium which is distributed to users providing programs and embodied by, the magnetic disk 121 (including floppy disk), the optical disc 122 (including CD-ROM (Compact Disc-Read Only Memory) and DVD (Digital Versatile Disc)), the magneto-optical disk 123 (including MD (Mini Disk)), the semiconductor memory 124, a ROM 102 or a hard disk which is preinstalled in a personal computer and provided for users and on which the programs are stored temporarily or permanently as shown in FIG. 26.

It should be noted that the steps describing the programs to be stored on the program storage medium are not only executed in a time-dependent manner in the order described, but also in parallel or in a discrete manner.

As described, and according to the first image coding apparatus and method and the program stored in the first recording medium, a video steam is separated from a multiplexed stream containing multimedia coding data, a predetermined conversion process is performed on the separated video stream, and additional information indicative of a mismatch occurs when displaying the converted video stream on the basis of the multimedia coding data.

The first recording medium stores the converted video stream, the multimedia coding data, and the additional information indicative that a mismatch will occur when displaying the converted video stream on the basis of the above-mentioned multimedia coding data.

Consequently, in any case, the reproducing side can prevent a mismatch from occurring between the video stream and the multimedia coding data.

As described and according to the image decoding apparatus and method and the program stored in the second recording medium, a mismatch occurs when a video stream is separated from an input multiplexed stream, the separated video stream is decoded, and the decoded video stream is displayed on the basis of multimedia coding information. On the basis of the additional information about this mismatch occurrence, a predetermined conversion process is performed on the decoded video stream. This novel configuration prevents the mismatch from occurring between the video stream and the multimedia coding data.

As described and according to the second image coding apparatus and method and the program stored in the third recording medium, a video stream is separated from an input multiplexed stream, the input multiplexed stream is checked for multimedia coding data and, if the multimedia coding data is found, coding control information for giving an instruction not to change the display format of the separated video stream is generated, and a predetermined conversion process is performed on the separated video stream on the basis of the generated coding control information.

The second recording medium also stores the above-mentioned coding control information giving instruction not to change the display format of a video stream and a multiplexed stream containing the video stream on which a predetermined conversion process has been performed on the basis of the coding control information.

Consequently, in any case, the reproduction side can prevent a mismatch from occurring between the video stream and the multimedia coding data.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A non-transitory computer-readable medium having data stored thereon for processing by an image decoding apparatus so that multimedia content is presented in an intended manner by a display, said computer-readable medium comprising:

a data recording area containing data representing a converted video stream, at least another stream, multimedia coding data for controlling display of an original video stream and the at least another stream on a common display device, and sub-information, the converted video stream being generated for inclusion in the data recording area by performing a predetermined conversion process on the original video stream, the sub-information including at least one of a display frame size or an aspect ratio of the original video stream and including an indicator value representing whether a mismatch is present in a relationship between the converted video stream and the multimedia decoding data as a result of the predetermined conversion process performed on the original video stream, the predetermined conversion process being controlled by control information on which the sub-information is based such that upon reproduction of the data contained in the data recording area and in response to the indicator value contained in the sub-information indicating that the mismatch is present in the relationship between the converted video stream and the multimedia decoding data, a display mismatch on the common display device between the converted video stream and the at least another stream is avoided using the at least one of a display frame size or an aspect ratio of the original video stream contained in the sub-information in combination with the multimedia coding data.

2. The non-transitory computer-readable medium according to claim 1, wherein said data recording area stores the sub-information which is coded and stored as data separate from a multiplexed stream containing the converted video stream, the at least another stream, and the multimedia coding data.

3. The non-transitory computer-readable medium according to claim 1, wherein said data recording area stores the sub-information which is coded and stored as data multiplexed with a multiplexed stream containing the converted video stream, the at least another stream, and the multimedia coding data such that the sub-information is distinct from the converted video stream, the at least another stream, and the multimedia coding data within the data stream.

4. The non-transitory computer-readable medium according to claim 1, wherein the predetermined conversion process includes converting the original video stream in its picture frame parameter.

5. The non-transitory computer-readable medium according to claim 1, wherein the predetermined conversion process includes the original video stream being decoded and then encoded.

6. The non-transitory computer-readable medium according to claim 1, wherein the sub-information includes another of the display frame size or the original screen aspect ratio associated with the original video stream.

7. The non-transitory computer-readable medium according to claim 1, wherein the sub-information includes information about an original video format associated with the original video stream.

8. The non-transitory computer-readable medium according to claim 1, wherein the sub-information includes information indicating whether a picture frame of said original video stream has been converted during the predetermined conversion process.

9. The non-transitory computer-readable medium according to claim 1, wherein the multimedia coding data includes a video display position and video display size of the original video stream on the common display device.

10. The non-transitory computer-readable medium according to claim 9, wherein the multimedia coding data includes a display position and display size of the at least another stream on the common display device.

11. The non-transitory computer-readable medium according to claim 9, wherein upon the reproduction of the data contained in the data recording area, the display mismatch on the common display device between the converted video stream and the at least another stream is avoided using the sub-information, in combination with the multimedia coding data, to keep a video display position and video display size of the converted video stream unchanged from the video display position and video display size of the original video stream regardless of the predetermined conversion process carried out.

12. The non-transitory computer-readable medium according to claim 1, wherein the sub-information includes a mismatch flag as the indicator value representing whether there exists the mismatch in the relationship between the converted video stream and the multimedia coding data.

13. The non-transitory computer-readable medium according to claim 1, wherein the sub-information includes a re-encoded flag indicating whether the original video stream has been re-encoded.

14. The non-transitory computer-readable medium according to claim 1, wherein the sub-information includes a frame size change flag indicating whether a picture frame of the original video stream has been changed.

* * * * *